(12) United States Patent
Pianigiani et al.

(10) Patent No.: US 11,329,914 B2
(45) Date of Patent: *May 10, 2022

(54) USER CUSTOMIZATION AND AUTOMATION OF OPERATIONS ON A SOFTWARE-DEFINED NETWORK

(71) Applicant: Juniper Networks, Inc., Sunnyvale, CA (US)

(72) Inventors: Jacopo Pianigiani, Cupertino, CA (US); Vivekananda Shenoy, Singapore (SG); Atul S Moghe, San Jose, CA (US); Tong Jiang, Fremont, CA (US); Akshaya Muralidharan, San Diego, CA (US); Rishabh Ramakant Tulsian, Livermore, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/169,303

(22) Filed: Feb. 5, 2021

(65) Prior Publication Data

US 2021/0184971 A1  Jun. 17, 2021

Related U.S. Application Data

(63) Continuation of application No. 16/231,210, filed on Dec. 21, 2018, now Pat. No. 10,917,339.

(51) Int. Cl.
*H04L 45/586* (2022.01)
*G06F 9/455* (2018.01)
(Continued)

(52) U.S. Cl.
CPC ........ *H04L 45/586* (2013.01); *G06F 9/45558* (2013.01); *H04L 12/4633* (2013.01);
(Continued)

(58) Field of Classification Search
CPC .............. H04L 45/586; H04L 12/4633; H04L 12/4641; H04L 41/12; G06F 9/45558; G06F 2009/45595; G06F 2009/45591

See application file for complete search history.

(56) References Cited

U.S. PATENT DOCUMENTS 7,184,437 B1  2/2007 Cole et al.
9,571,394 B1  2/2017 Sivaramakrishnan et al.
(Continued)

FOREIGN PATENT DOCUMENTS

WO  2013184846 A1  12/2013

OTHER PUBLICATIONS

Shah, Gourav. "Ansible Playbook Essentials". PACKT Publishing, pp. 1-168. (Year: 2015).*

(Continued)

*Primary Examiner* — John M MacIlwinen
(74) *Attorney, Agent, or Firm* — Shumaker & Sieffert, P.A.

(57) ABSTRACT

In general, techniques are described for defining and executing device-independent commands on a network having a plurality of network devices. In some examples, a controller includes a graphical user interface. The controller displays, via the graphical user interface, network devices that support a device-independent command selected from one or more device-independent commands, wherein each device-independent command performs one or more operations on supported network devices. The controller receives, via the graphical user interface, user input selecting two or more of the displayed network devices and performs the one or more operations of the selected device-independent command on the selected network devices. In some examples, performing includes executing tasks associated with each network (Continued)

device, wherein the tasks, when executed, perform the one or more operations on each respective network device.

15 Claims, 22 Drawing Sheets

(51) Int. Cl.
  *H04L 12/46* (2006.01)
  *H04L 41/12* (2022.01)
  *H04L 41/22* (2022.01)
  *H04L 45/64* (2022.01)
(52) U.S. Cl.
  CPC .......... *H04L 12/4641* (2013.01); *H04L 41/12* (2013.01); *H04L 41/22* (2013.01); *H04L 45/64* (2013.01); *G06F 2009/45591* (2013.01); *G06F 2009/45595* (2013.01)

(56) References Cited

U.S. PATENT DOCUMENTS

| | | | |
|---|---|---|---|
| 9,619,631 B1* | 4/2017 | DeHaan | G06F 21/31 |
| 10,200,248 B1 | 2/2019 | Jiang et al. | |
| 10,742,501 B1 | 8/2020 | Pianigiani et al. | |
| 10,917,339 B2* | 2/2021 | Pianigiani | G06F 9/5072 |
| 2003/0051008 A1* | 3/2003 | Gorthy | H04L 41/0226 |
| | | | 709/220 |
| 2008/0222285 A1 | 9/2008 | Hickey et al. | |
| 2012/0303758 A1* | 11/2012 | Anbarasan | H04L 41/0266 |
| | | | 709/218 |
| 2014/0047341 A1 | 2/2014 | Breternitz et al. | |
| 2014/0095677 A1* | 4/2014 | Croy | H04L 41/16 |
| | | | 709/220 |
| 2016/0234074 A1 | 8/2016 | Prasetya | |
| 2016/0330080 A1* | 11/2016 | Bhatia | H04L 41/12 |
| 2019/0342166 A1* | 11/2019 | Chaware | H04L 41/0823 |
| 2020/0059459 A1 | 2/2020 | Abraham et al. | |
| 2020/0195501 A1 | 6/2020 | Shenoy et al. | |

OTHER PUBLICATIONS

Response to Examination Report dated Apr. 6, 2021 from counterpart European Application No. 19180604.1, dated Aug. 3, 2021, 22 pp.

Saint-Andre, P., "Extensible Messaging and Presence Protocol (XMPP): Core," Internet Engineering Task Force (IETF), RFC 6120, Mar. 2011, 211 pp.

Extended Search Report from counterpart European Application No. 19180604.1, dated Feb. 7, 2020, 10 pp.

U.S. Appl. No. 16/947,508, filed Aug. 4, 2020, Juniper Networks, Inc. (inventor: Pianigiani), entitled "Automation of Maintenance Mode Operations for Network Devices".

Response filed Dec. 22, 2020 to the Extended Search Report from counterpart European Application No. 19180604.1, dated Feb. 7, 2020, 55 pp.

Prosecution history of U.S. Appl. No. 16/231,210 dated Jun. 4, 2020 through Dec. 23, 2020, 44 pp.

Examination Report from counterpart European Application No. 19180604.1, dated Apr. 6, 2021, 9 pp.

Summons to Attend Oral Proceedings Pursuant to Rule 115(1) EPC from counterpart European Application No. 19180604.1 dated Oct. 19, 2021, 10 pp.

* cited by examiner

```
{
  "fq_name": [
    "default-global-system-config",
    "show_config_interfaces_template"
  ],
  "name": "show_config_interfaces_template",
  "display_name": "Show Configured Interfaces",
  "description": "This command is used to get a list of configured interfaces",
  "parent_type": "global-system-config",
  "job_template_multi_device_job": true,
  "job_template_type": "device_operation",
  "job_template_concurrency_level": "device",
  "job_template_playbooks": {
    "playbook_info": [
      {
        "device_family": "",
        "playbook_uri": "./opt/contrail/fabric_ansible_playbooks/operational_command.yml",
        "vendor": "juniper"
      }
    ]
  },
  "job_template_output_schema": "",
  "job_template_input_schema": "",
  "job_template_input_ui_schema": ""
}
```

FIG. 8

```
"href": "http://10.155.73.101:8082/fabric/b0ed2355-df0c-4958-9a36-83eac8576509",
"attr": null,
"uuid": "b0ed2355-df0c-4958-9a36-83eac8576509",
    }
},
"name": "vsrx-spoke2",
"physical_router_device_family": "junos-es",
"physical_router_management_ip": "10.155.72.100",
"fq_name": [
    "default-global-system-config",
    "vsrx-spoke2"
],
"uuid": "02cdba5b-b2ed-4979-8b0c-b4fa778bb65e",
"physical_router_vendor_name": "Juniper",
"physical_router_product_name": "vsrx",
```

FIG. 9

```
- import_role:
    name: juniper.junos

- name: Execute commands on a Juniper Device to get interfaces
  juniper_junos_config:
    provider:
      host: "{{device_management_ip}}"
      username: "{{device_username}}"
      password: "{{device_password}}"
      port: 22
      timeout: "{{JUNOS_COMMAND_TIMEOUT|int}}"
    retrieve: 'committed'
    filter: 'interfaces'
    diff: true
    check: false
    commit: false
    config_mode: 'private'
    format: xml
    options:
      inherit: inherit
  register: command_resp

- name: settings facts
  set_fact:
    command_resp: "{{command_resp|
      json_query('config_parsed.configuration.interfaces.interface')}}"
```

{"interface_stats": [{"admin_status": "", "input_rate": "", "op_status": "", "name": "lc-0/0/0.32769",
"output_rate": ""}, {"admin_status": "", "input_rate": "", "op_status": "", "name": "pfe-0/0/0.16383",
"output_rate": ""}, {"admin_status": "", "input_rate": "", "op_status": "", "name": "pfh-0/0/0.16383",
"output_rate": ""}, {"admin_status": "", "input_rate": "", "op_status": "", "name": "lc-0/1/0.32769",
"output_rate": ""}, {"admin_status": "", "input_rate": "", "op_status": "", "name": "pfe-0/1/0.16383",
"output_rate": ""}, {"admin_status": "", "input_rate": "", "op_status": "", "name": "lc-0/2/0.32769",
"output_rate": ""}, {"admin_status": "", "input_rate": "", "op_status": "", "name": "pfe-0/2/0.16383",
"output_rate": ""}, {"admin_status": "", "input_rate": "", "op_status": "", "name": "lc-0/3/0.32769",
"output_rate": ""}, {"admin_status": "", "input_rate": "", "op_status": "", "name": "pfe-0/3/0.16383",
"output_rate": ""}, {"admin_status": "", "input_rate": "", "op_status": "", "name": "ge-0/3/4.0",
"output_rate": ""}, {"admin_status": "", "input_rate": "", "op_status": "", "name": "pc-1/0/0.16383",
"output_rate": ""}, {"admin_status": "", "input_rate": "", "op_status": "", "name": "pfe-1/0/0.16383",
"output_rate": ""}, {"admin_status": "", "input_rate": "", "op_status": "", "name": "pfh-1/0/0.16383",
"output_rate": ""}, {"admin_status": "", "input_rate": "", "op_status": "", "name": "pc-1/1/0.16383",
"output_rate": ""}, {"admin_status": "", "input_rate": "", "op_status": "", "name": "pfe-1/1/0.16383",
"output_rate": ""}, {"admin_status": "", "input_rate": "", "op_status": "", "name": "em0.0",
"output_rate": ""}, {"admin_status": "", "input_rate": "", "op_status": "", "name": "em1.0",
"output_rate": ""}, {"admin_status": "", "input_rate": "", "op_status": "", "name": "fxp0.0",
"output_rate": ""}, {"admin_status": "", "input_rate": "", "op_status": "", "name": "jsrv.1",
"output_rate": ""}, {"admin_status": "", "input_rate": "", "op_status": "", "name": "lo0.0",
"output_rate": ""}, {"admin_status": "", "input_rate": "", "op_status": "", "name": "lo0.16384",
"output_rate": ""}, {"admin_status": "", "input_rate": "", "op_status": "", "name": "lo0.16385",
"output_rate": ""}] }

FIG. 13

USER CUSTOMIZATION AND AUTOMATION OF OPERATIONS ON A SOFTWARE-DEFINED NETWORK

This application is a continuation of U.S. application Ser. No. 16/231,210, filed Dec. 21, 2018, the entire content of which is incorporated by reference herein.

TECHNICAL FIELD

Techniques of this disclosure relate generally to computer networks and more particularly to the configuration of virtual networks.

BACKGROUND

Virtualized networks are becoming a core foundation of the modern information technology (IT) infrastructure. Modern data centers, for instance, use virtualized environments in which virtual compute nodes (also referred to as virtual execution elements), such as virtual machines or containers, are deployed and execute on an underlying compute platform of networked physical computing devices.

Large-scale data centers, such as cloud data center environments, employ collections of networked servers to provide computing and/or storage capacity to subscribers running various applications. The data center may, for example, host the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Virtualization provides several advantages. One advantage is that virtualization can provide significant improvements in efficiency. Servers have, with the advent of multicore microprocessor architectures with a large number of cores per physical CPU, become increasingly powerful; that power can be distributed across applications and subscribers easily and efficiently in a virtual environment. A second advantage is that virtualization provides significant control over the computing infrastructure. As physical computing resources become fungible resources, such as in a cloud-based computing environment, provisioning and management of the computing infrastructure becomes easier. Thus, enterprise IT staff often prefer to use virtualized compute clusters in data centers since they provide simplified management and increased return on investment (ROI) in addition to their compute efficiency.

Software-defined networking (SDN) is increasingly being employed to deploy workloads in virtualized data centers. Such approaches simplify management of virtual and physical compute devices, virtual and physical storage systems and virtual and physical networks by abstracting out complexity in the underlying infrastructure. A software-defined data center (SDDC) is a data center that uses software-defined networking to virtualize the underlying infrastructure and to deliver aspects of the virtualized infrastructure as a service.

SUMMARY

In general, software-defined data centers use an intent model to automate the daily tasks for delivering multitenant services on a data center (DC) fabric. Intent-based automation tools do not, however, allow the users of the system to implement specific operations as in traditional element management systems (EMS). Currently, users and administrators may need to compromise between the ease of control provided by SDN abstraction (the intent) and the greater control provided by low-level operations performed via a command line interface (CLI) or a traditional EMS.

This disclosure describes techniques that enable device-independent commands across different types of network devices, which provide a mechanism for users and administrators to implement specific operations on heterogenous groups of devices in a network. In various examples, a device-independent command may be defined using a job template, a set of tasks and input, output and input_ui schema. The devices that support each device-independent command are defined by the tasks needed to perform the device-independent command on the device and by the template defined for the device. The result is an advantageous way to execute device-independent commands across network devices from a variety of product vendors while achieving similar results. Operations on device families may, for instance, be expressed as tasks and templates using Ansible playbooks and Jinga2 templates, respectively. In one example approach, a graphical user interface on a virtual network controller provides a mechanism for defining the generic operation and for applying the device-independent command to devices based on representative task and template files. The result provides flexibility in conducting device agnostic tests across heterogenous networks.

In one example, a method includes displaying, via a graphical user interface, network devices that support a device-independent command selected from one or more device-independent commands, wherein each device-independent command performs one or more operations on supported network devices; receiving, via the graphical user interface, user input selecting two or more of the displayed network devices, wherein each network device has a network device family, wherein one of the two or more selected network devices is from a first device family and responds to a first set of device commands associated with the first network device family and wherein another of the two or more selected network devices is from a second device family and responds to a second, different, set of device commands associated with the second network device family; and performing the one or more operations of the selected device-independent command on the selected network devices, wherein performing the one or more operations includes executing, on each selected network device, tasks based on commands from the command set associated with the network device family of the respective selected network device, wherein the tasks, when executed, perform the one or more operations on the respective selected network device.

In one example, a virtual network controller includes a memory; a graphical user interface; and one or more processors connected to the memory and to the graphical user interface, wherein the memory includes instructions that, when executed by the one or more processors, cause the processors to display, via the graphical user interface, network devices that support a device-independent command selected from one or more device-independent commands, wherein each device-independent command performs one or more operations on supported network devices; and receive, via the graphical user interface, user input selecting two or more of the displayed network devices, wherein each network device has a network device family, wherein one of the two or more selected network devices is from a first device family and responds to a first set of device commands associated with the first network device family and wherein another of the two or more selected network devices is from a second device family and responds to a second, different, set of device commands associated with the second network device family; and perform the one or more operations of the selected device-independent command on the selected network devices, wherein performing the one or more operations includes executing, on each selected network device, tasks based on commands from the command set associated with the network device family of the respective selected network device, wherein the tasks, when executed, perform the one or more operations on the respective selected network device.

In another example, a method includes defining, in a network controller, a device-independent command, wherein the device-independent command, when executed, performs one or more operations on supported network devices; identifying two or more network device families; configuring the device-independent command to perform on the identified network device families, wherein network devices from one of the identified network device families are associated with and respond to one set of commands and network devices from another of the identified network device families are associated with and respond to a different set of commands, wherein configuring includes selecting, for each identified network device family and based on the set of commands associated with each identified network device family, one or more tasks that, when executed, perform the one or more operations of the device-independent command on network devices from the respective identified network device family; selecting a network device associated with one of the identified network device families; and performing the operations of the device-independent command on the selected network device, wherein performing includes executing the tasks selected for the network device family associated with the selected network device.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 8 is a block diagram illustrating an example job template associated with a device-independent command, in accordance with techniques described herein.

FIG. 9 illustrates a representative network device on which device-independent commands may be performed, in accordance with techniques described herein.

FIG. 11 illustrates an example Ansible playbook for the router of FIG. 9.

FIG. 12 illustrates an example template for device-independent command on a specified network device, according to one aspect of the disclosure.

FIG. 13 illustrates an output file resulting from execution of a device-independent command on a selected network device, according to one aspect of the disclosure.

Like reference characters denote like elements throughout the figures and text.

DETAILED DESCRIPTION

As noted above, a software-defined data center (SDDC) is a data center that uses software-defined networking (SDN) to virtualize the underlying infrastructure and to deliver aspects of the virtualized infrastructure as a service. Software-defined data centers typically use an intent model to automate the daily tasks for delivering multitenant services on a data center (DC) fabric. Intent-based automation tools do not, however, allow the user of the system to implement specific operations as in a traditional element management system (EMS). Currently, users/administrators may need to compromise between the ease of control provided by SDN abstraction (the intent) and the greater control provided by low-level operations performed via a command line interface (CLI) or a traditional EMS. This disclosure describes techniques that enable administrators to specify and execute device-independent commands (also described as generic device operations) for implementing specific operations on devices in a network.

Figure 1:
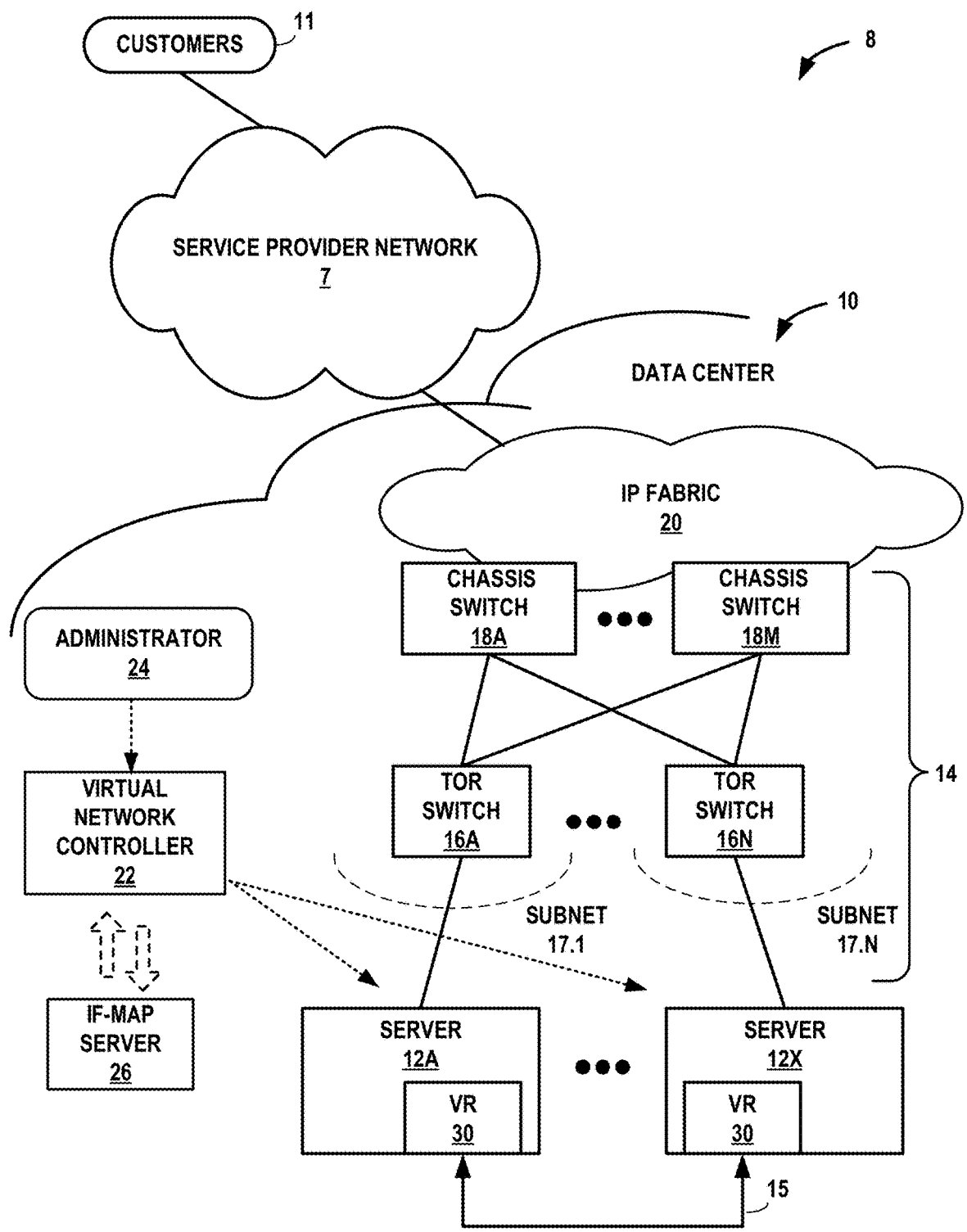
FIG. 1 is a block diagram illustrating an example network having a data center in which examples of the techniques described herein may be implemented.

FIG. 1 is a block diagram illustrating an example network 8 having a data center 10 in which examples of the techniques described herein may be implemented. In general, data center 10 provides an operating environment for applications and services for customers 11 coupled to the data center by service provider network 7. Data center 10 may, for example, host infrastructure equipment, such as networking and storage systems, redundant power supplies, and environmental controls. Service provider network 7 may be coupled to one or more networks administered by other providers, and may thus form part of a large-scale public network infrastructure, e.g., the Internet. In some examples, data center 10 may be distributed across a number of geographically distributed locations.

As illustrated in the example of FIG. 1, data center 10 may be a facility that provides network services for customers 11. Customers 11 may be collective entities such as enterprises and governments or individuals. For example, a network data center may host web services for several enterprises and end users. Other exemplary services may include data storage, virtual private networks, traffic engineering, file service, data mining, scientific- or super-computing, and so on. In some embodiments, data center 10 may be individual network servers, network peers, or otherwise.

In this example, data center 10 includes a set of storage systems and application servers 12A-12X (herein, "servers 12") interconnected via a high-speed switch fabric 14 provided by one or more tiers of physical network switches and routers. In the example shown in FIG. 1, switch fabric 14 includes a set of interconnected top-of-rack (TOR) switches 16A-16BN (collectively, "TOR switches 16") coupled to a distribution layer of chassis switches 18A-18M (collectively, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In the example shown in FIG. 1, TOR switches 16 and chassis switches 18 provide servers 12 with redundant (multi-homed) connectivity to IP fabric 20 and service provider network 7 via subnets 17.1-17.N (collectively "subnets 17"). Chassis switches 18 aggregate traffic flows and provides high-speed connectivity between TOR switches 16. TOR switches 16 may include network devices that provide layer 2 (e.g., MAC) and/or layer 3 (e.g., IP) routing and/or switching functionality. TOR switches 16 and chassis switches 18 may each include one or more processors and a memory, and may be capable of executing one or more software processes. Chassis switches 18 are coupled to IP fabric 20, which performs layer 3 routing to route network traffic between data center 10 and customers 11 by service provider network 7.

Virtual network controller 22 ("VN controller 22") provides a logically and in some cases physically centralized controller for facilitating operation of one or more virtual networks within data center 10 in accordance with one or more embodiments of this disclosure. In some examples, virtual network controller 22 may operate in response to configuration input received from network administrator 24. Additional information regarding virtual network controller 22 operating in conjunction with other devices of data center 10 or with other software-defined networks is found in International Application Number PCT/US2013/044378, filed Jun. 5, 2013, and entitled PHYSICAL PATH DETERMINATION FOR VIRTUAL NETWORK PACKET FLOWS, the description of which is incorporated herein by reference as if fully set forth herein.

Figure 2:
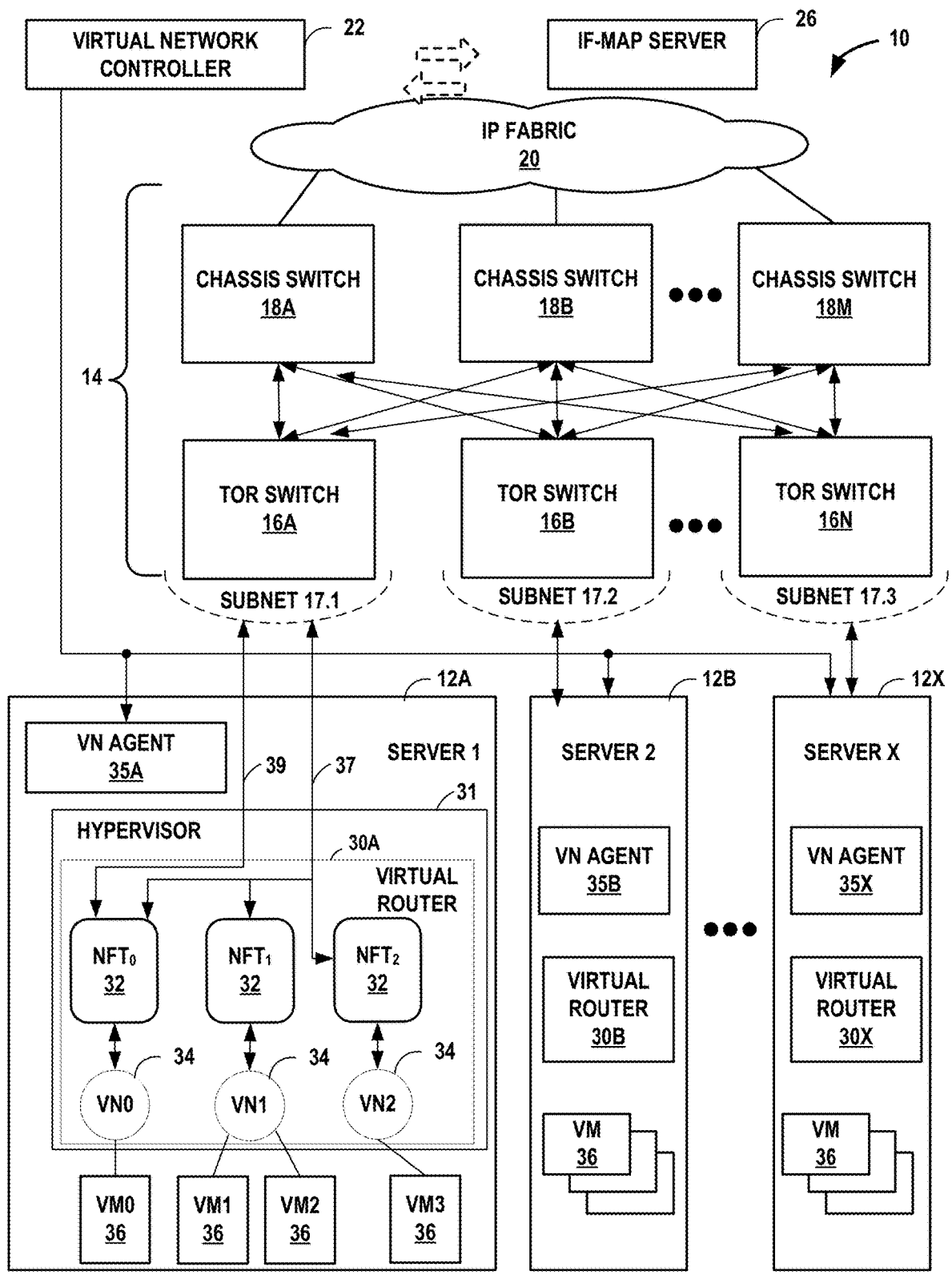
FIG. 2 is a block diagram illustrating an example implementation of the data center of FIG. 1 in further detail.

In one example approach, virtual network controller 22 is a logically centralized but physically distributed software-defined network (SDN) controller. Physically distributed means that the virtual network controller 22 may include multiple types of nodes, each of which may have multiple instances for high availability (HA) and horizontal scaling. In one such example approach, the virtual network controller 22 includes three types of nodes: configuration nodes, control nodes and analytics nodes. These node instances may be implemented in physical servers 12 or on virtual machines. In one such example approach, configuration nodes in virtual network controller 22 configure the control nodes via a technology data model stored on an Interface for Metadata Access Points (IF-MAP) server 26 such as shown in FIG. 2. In some approaches, virtual network controller 22 is implemented using the Contrail Controller, available from Juniper Networks, or using Tungsten Fabric, an open source network virtualization platform available from the Linux Foundation.

Typically, the traffic between any two network devices, such as between network devices within IP fabric 20 (not shown) or between servers 12 and customers 11 or between servers 12, for example, can traverse the physical network using many different paths. For example, there may be several different paths of equal cost between two network devices. In some cases, packets belonging to network traffic from one network device to the other may be distributed among the various possible paths using a routing strategy called multi-path routing at each network switch node. For example, the Internet Engineering Task Force (IETF) RFC 2992, "Analysis of an Equal-Cost Multi-Path Algorithm," describes a routing technique for routing packets along multiple paths of equal cost. The techniques of RFC 2992 analyze one particular multipath routing strategy involving the assignment of flows to bins by hashing packet header fields that sends all packets from a particular network flow over a single deterministic path.

For example, a "flow" can be defined by the five values used in a header of a packet, or "five-tuple," i.e., the protocol, Source IP address, Destination IP address, Source port and Destination port that are used to route packets through the physical network. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

In accordance with various aspects of the techniques described in this disclosure, one or more of servers 12 may include a virtual router that executes multiple routing instances for corresponding virtual networks within data center 10. Packets received by the virtual router of server 12A, for instance, from the underlying physical network fabric may include an outer header to allow the physical network fabric to tunnel the payload or "inner packet" to a physical network address for a network interface of server 12A that executes the virtual router. The outer header may include not only the physical network address of the network interface of the server but also a virtual network identifier such as a VxLAN tag or Multiprotocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier. In the example approach of FIG. 1, a virtual router (vRouter) 30 on server 12A communicates via a tunnel 15 to a vRouter 30 on server 12X, as will be discussed in more detail below.

In some example approaches, vRouters 30 aggregate tunneled packets received from the underlying physical network fabric prior to delivery to the appropriate routing instance for each packet. In some examples, the vRouter 30 aggregates the tunneled packets according to matching criteria that includes the virtual network identifier of the outer header as well as one or more fields of the inner header. That is, a vRouter 30 executing on one of servers 12 may receive inbound tunnel packets of a packet flow from switches 16 and, prior to routing the tunnel packets to a locally executing virtual machine, process the tunnel packets to construct a single, aggregate tunnel packet for forwarding to the virtual machine. That is, the vRouter 30 may buffer multiple inbound tunnel packets and construct the single, tunnel packet in which the payloads of the multiple tunnel packets are combined into a single payload and the outer/overlay headers on the tunnel packets are removed and replaced with a single header virtual network identifier. In this way, the aggregate tunnel packet can be forwarded by the vRouter 30 to a virtual machine as if a single inbound tunnel packet was received from the virtual network. Moreover, to perform the aggregation operation, the vRouter 30 may leverage a kernel-based offload engine that seamlessly and automatically directs the aggregation of tunnel packets.

In some example approaches, vRouters 30 executing on servers 12 may steer received inbound tunnel packets among multiple processor cores to facilitate packet processing load balancing among the cores when processing the packets for routing to one or more virtual and/or physical machines. As one example, server 12A may include multiple network interface cards and multiple processor cores to execute the virtual router and may steer received packets among multiple processor cores to facilitate packet processing load balancing among the cores. For instance, a particular network interface card of server 12A may be associated with a designated processor core to which the network interface card directs all received packets. The various processor cores, rather than processing each of the received packets, may offload flows to one or more other processor cores, in accordance with a hash function applied to at least one of the inner and outer packet headers, for processing to take advantage of available work cycles of the other processor cores.

In some such example approaches, the virtual routers 30 executing on servers 12 may proactively add, via the virtual router 30, flow table entries to identify reverse flows of flows processed by a routing instance of the virtual router 30. In an example implementation, the virtual router of server 12A may proactively add flow table entries to identify reverse flows of flows processed by a routing instance of the virtual router. For example, a virtual machine executing on server 12A and a member of a virtual network implemented by data center 10 may receive an initial inbound tunnel packet for a packet flow originated by virtual machine executing on server 12X and also a member of the virtual network. Upon receiving the initial inbound tunnel packet, in addition to adding a flow table entry specifically for the inbound packet flow, the virtual router of server 12A may also proactively add a flow table entry specifically for the reverse packet flow (i.e., an outbound packet flow) that corresponds to the received inbound packet flow. In this way, server 12A may predict the need to process outbound tunnel packets having reverse flow criteria and, as a result, more efficiently look up and use the flow table entry for the reverse packet flow to process subsequent packets that belong to the reverse packet flow. The approaches described above in the context of FIG. 1 are also described in U.S. Pat. No. 9,571,394, issued Feb. 14, 2017, and entitled TUNNELED PACKET AGGREGATION FOR VIRTUAL NETWORKS, the descriptions of which are incorporated herein by reference.

FIG. 2 is a block diagram illustrating an example implementation of data center 10 of FIG. 1 in further detail. In the example of FIG. 2, data center 10 includes an overlay network that extends switch fabric 14 from physical switches 16, 18 to software or "virtual" switches 30A-30X (collectively, "vRouters 30"). VRouters 30 dynamically create and manage one or more virtual networks 34 usable for communication between application instances. In one example, vRouters 30 execute the virtual network as an overlay network, which provides the capability to decouple an application's virtual address from a physical address (e.g., IP address) of the server 12 on which the application is executing. Each virtual network may therefore use its own addressing and security scheme and may be viewed as orthogonal from the physical network and its addressing scheme. Various techniques may be used to transport packets within and across virtual networks 34 over the physical network. For example, a virtual network 34 may be configured to provide multicast service within the virtual network without requiring multicast support in the underlying physical network.

Each vRouter 30 may execute within a hypervisor 31, a host operating system or other component of each of servers 12. Each of servers 12 may represent an x86 or other general-purpose or special-purpose server capable of executing virtual machines 36. In the example of FIG. 2, vRouter 30A executes within hypervisor 31, also often referred to as a virtual machine manager (VMM), which provides a virtualization platform that allows multiple operating systems to run concurrently on one of servers 12. In the example of FIG. 2, vRouter 30A manages virtual networks 34, each of which provides a network environment for use by the one or more virtual machines (VMs) 36 executing on top of the virtualization platform provided by hypervisor 31. Each VM 36 is associated with one of the virtual networks VN0-VN2 and may represent tenant VMs running customer applications such as Web servers, database servers, enterprise applications, or hosting virtualized services used to create service chains. In some cases, any one or more of servers 12 or another computing device may host customer applications directly, i.e., not as virtual machines. Virtual machines as referenced herein, e.g., VMs 36, 110, and servers 12, or another separate computing device that hosts a customer application may alternatively be referred to as "hosts."

In general, each VM 36 may be any type of software application and may be assigned a virtual address for use within a corresponding virtual network 34, where each of the virtual networks may be a different virtual subnet provided by vRouter 30A. A VM 36 may be assigned its own virtual layer three (L3) IP address, for example, for sending and receiving communications but may be unaware of an IP address of the physical server 12A on which the virtual machine is executing. In this way, a "virtual address" is an address for an application that differs from the logical address for the underlying, physical computer system, e.g., server 12A in the example of FIG. 2.

In one implementation, each of servers 12 includes a corresponding one of virtual network (VN) agents 35A-35X (collectively, "VN agents 35") that controls the overlay of virtual networks 34 and that coordinates the routing of data packets within server 12. In general, each VN agent 35 communicates with virtual network controller 22, which generates commands to control routing of packets through data center 10. VN agents 35 may operate as a proxy for control plane messages between virtual machines 36 and virtual network controller 22. For example, a VM 36 may request to send a message using its virtual address via the VN agent 35A, and VN agent 35A may in turn send the message and request that a response to the message be received for the virtual address of the VM 36 that originated the first message. In some cases, a VM 36 may invoke a procedure or function call presented by an application programming interface of VN agent 35A, and the VN agent 35A may handle encapsulation of the message as well, including addressing.

In one example, network packets, e.g., layer three (L3) IP packets or layer two (L2) Ethernet packets, generated or consumed by the instances of applications executed by virtual machines 36 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed within vRouters 30, e.g., within the hypervisor 31 or on the host operating system running on each of servers 12. As another example, encapsulation and de-capsulation functions may be performed at the edge of switch fabric 14 at a first-hop TOR switch 16 that is one hop removed from the application instance that originated the packet. As noted above, this functionality is referred to herein as tunneling and may be used within data center 10 to create one or more overlay networks. Besides IPinIP, other example tunneling protocols that may be used include IP over GRE, VxLAN, MPLS over GRE, MPLS over UDP, etc.

As noted above, virtual network controller 22 provides a logically centralized controller for facilitating operation of one or more virtual networks within data center 10. Virtual network controller 22 may, for example, maintain a routing information base, e.g., one or more routing tables that store routing information for the physical network as well as one or more overlay networks of data center 10. Similarly, switches 16, 18 and vRouters 30 may maintain routing information, such as one or more routing and/or forwarding tables. In one example implementation, vRouter 30A of hypervisor 31 implements a network forwarding table (NFT) 32 for each virtual network 34. In general, each NFT 32 stores forwarding information for the corresponding virtual network 34 and identifies where data packets are to be forwarded and whether the packets are to be encapsulated in a tunneling protocol, such as with a tunnel header that may include one or more headers for different layers of the virtual network protocol stack.

In one such example approach, virtual machine VM1 sends an "inner packet" to vRouter 30A by an internal link. VRouter 30A uses $NFT_1$ to look up a virtual network destination network address for the inner packet. In one such example approach, $NFT_1$ specifies an outbound interface for vRouter 30A and encapsulation for the inner packet. VRouter 30A applies the encapsulation to add a tunnel header to generate an outer packet and outputs the outer packet on the outbound interface or, in this case, toward TOR switch 16A.

The routing information may, for example, map packet key information (e.g., destination IP information and other select information from packet headers) to one or more specific next hops within the networks provided by vRouters 30 and switch fabric 14. In some case, the next hops may be chained next hops that specify a set of operations to be performed on each packet when forwarding the packet, such as may be used for flooding next hops and multicast replication. In some cases, virtual network controller 22 maintains the routing information in the form of a radix tree having leaf nodes that represent destinations within the network. U.S. Pat. No. 7,184,437 provides details on an exemplary embodiment of a router that utilizes a radix tree for route resolution, the description of which is incorporated herein by reference in its entirety.

As shown in FIG. 2, each virtual network 34 provides an encapsulated packet communications framework 37 for the overlay network established through switch fabric 14. In this way, network packets associated with any of virtual machines 36 may be transported using encapsulated packet communications framework 37 via the overlay network. In addition, in the example of FIG. 2, each virtual router (vRouter) 30 includes a default network forwarding table $NFT_0$ and provides a default route that allows a packet to be forwarded to virtual subnet VN0 without encapsulation, i.e., non-encapsulated packet communications 39 per the routing rules of the physical network of data center 10. In this way, subnet VN0 and virtual default network forwarding table $NFT_0$ provide a mechanism for bypassing the overlay network and sending non-encapsulated packet communications via non-encapsulated communications framework 39 to switch fabric 14.

Moreover, virtual network controller 22 and vRouters 30 may communicate using virtual network VN0 as a subnet in accordance with default network forwarding table $NFT_0$ 32 during discovery and initialization of the overlay network, and during conditions where a failed link has temporarily halted communication via the overlay network. Once connectivity with the virtual network controller 22 is established, the virtual network controller 22 may update its local routing table to accommodate new information about any failed links and may direct vRouters 30 to update their local network forwarding tables 32. For example, virtual network controller 22 may output commands to virtual network agents 35 to update one or more NFTs 32 to direct vRouters 30 to change the tunneling encapsulation so as to re-route communications within the overlay network to, for example, avoid a failed link.

When a link failure is detected, a virtual network agent 35 local to the failed link (e.g., VN Agent 35A) may immediately change the encapsulation of network packets to redirect traffic within the overlay network and may notify virtual network controller 22 of the routing change. In turn, virtual network controller 22 may update its routing information and may issue messages to other virtual network agents 35 to update local routing information stored by the virtual network agents within network forwarding tables 32.

Figure 3A:
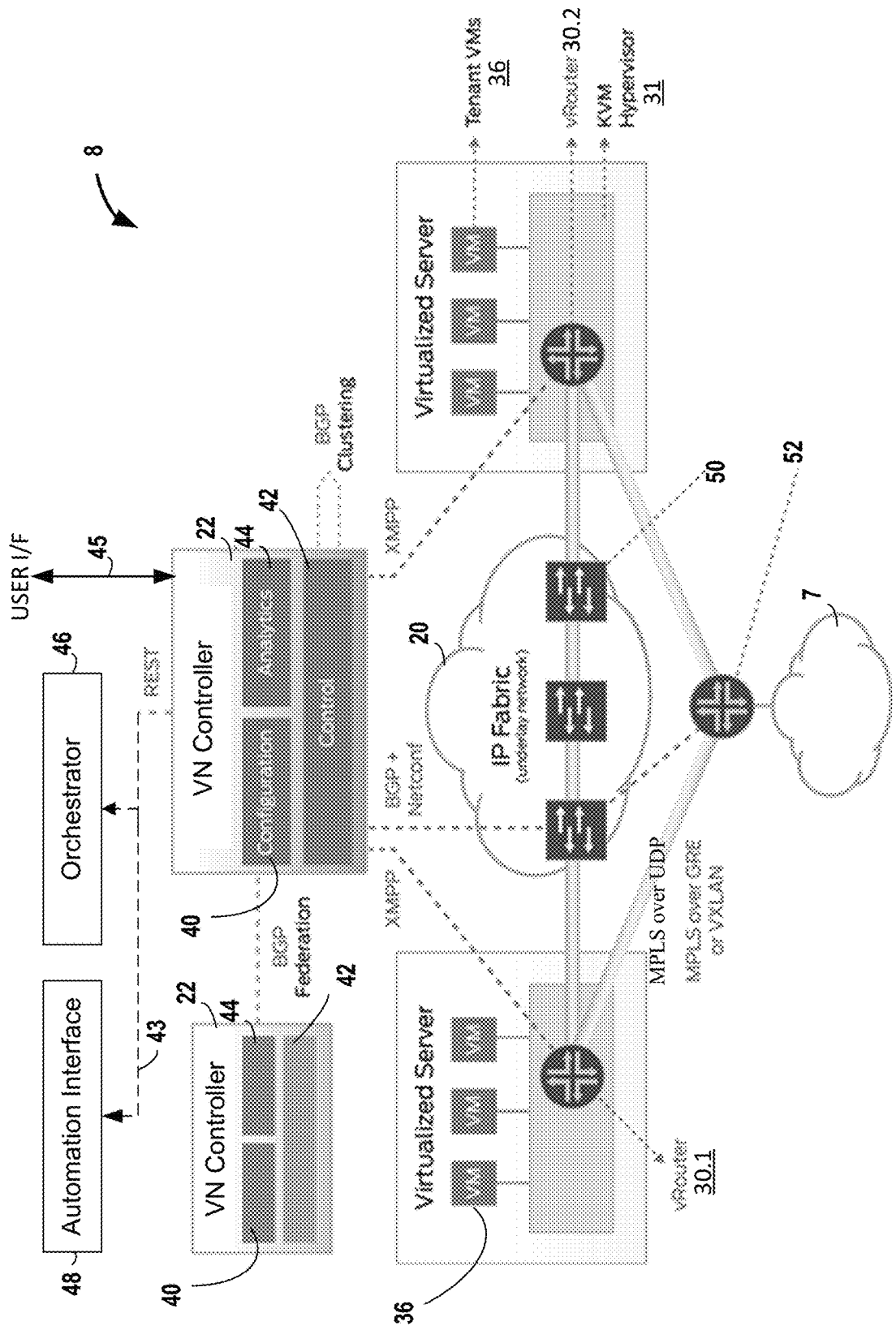
FIG. 3A is a block diagram illustrating a software-defined network according to techniques described herein.

FIG. 3A is a block diagram illustrating an example software-defined network implementation of network 8 (FIGS. 1-2) according to techniques described herein. In one example approach, each vRouter 30 forwards packets from one virtual machine 36 to other virtual machines via a set of server-to-server tunnels. The tunnels form an overlay network sitting on top of the physical network (such as, for example, a physical IP-over-Ethernet network). In the example shown in FIG. 3A, virtual machines 36 on one vRouter 30 communicate with virtual machines 36 on other vRouters 30 via MPLS over GRE, MPLS over UDP or VXLAN.

In the example approach of FIG. 3A, virtual network controller 22 is a software-defined network (SDN) controller. As noted above in the discussion of FIGS. 1 and 2, in some example approaches, virtual network controller 22 is logically centralized but may be physically distributed across many devices. In one example approach, controller 22 includes a user interface 45 and various types of nodes, each of which may have multiple instances for high availability (HA) and horizontal scaling. In one example approach, such as shown in FIG. 3A, virtual network controller 22 includes three types of nodes: configuration nodes 40, control nodes 42 and analytics nodes 44. These node instances may be implemented in physical servers 12 or on virtual machines 36. In one such example approach, configuration nodes 40 in virtual network controller 22 configures the control nodes 42 via a technology data model stored on Interface for Metadata Access Points (IF-MAP) server 26 of FIG. 2.

In one example approach, configuration nodes 40 provide a management layer used to configure control node 42. In the example shown in FIG. 3A, configuration nodes 40 provide a northbound Representational State Transfer (REST) application programming interface (API) 43 that may be used by, for instance, an orchestrator 46 or an automation interface 48 to configure network 8 or to extract operational status of network 8. In one example approach, instantiated services are represented by objects in a horizontally scalable database that is described by a formal service data model. The configuration nodes 40 also contain a transformation engine (sometimes referred to as a compiler) that transforms the objects in the high-level service data model into corresponding lower-level objects in the technology data model. In some example approaches, the transformation engine may be accessed through user interface 45. An example transformation engine is described in TRANSLATING HIGH-LEVEL CONFIGURATION INSTRUCTIONS TO LOW-LEVEL DEVICE CONFIGURATION, U.S. patent application Ser. No. 15/198,657, filed Jun. 30, 2016, the description of which is incorporated herein by reference.

In one example approach, control nodes 42 implement the logically centralized portion of the control plane. In one example approach, not all control plane functions are logically centralized—some control plane functions are still implemented in a distributed fashion on the physical and virtual routers and switches in the network 8. The control nodes 42 may use the IF-MAP protocol to monitor the contents of the low-level technology data model as computed by the configuration nodes 40. Low-level data models describe the desired state of the network. The control nodes 42 may use a combination of southbound protocols (such as Extensible Messaging and Presence Protocol (XMPP)) to configure vRouters 30 and Border Gateway Protocol (BGP) and Network Configuration (NETCONF) protocols to control physical routers (such as underlay switches 50 in IP fabric 20). In some such example approaches the BGP and NETCONF protocols may also be used to control gateways 52. In one example approach, control nodes 42 also use BGP for state synchronization among each other when there are multiple instances of control node 42, such as for scale-out and high-availability (HA) reasons.

In one example approach, objects describing instantiated services are defined via a formal service data model. In such one example approach, the formal service data model is a high-level service data model used to describe the services that need to be implemented; each high-level service data model has an associated low-level technology data model that describes how those services need to be implemented. Each data model consists of a set of objects, their capabilities, and the relationships between them.

In one example approach, each formal service data model may be converted into a low-level technology data model describing how the services are to be implemented. In one such example approach, configuration nodes 40 in virtual network controller 22 transform any change in a high-level service data model to a corresponding set of changes in the corresponding low-level technology data model. Configuration nodes 40 may then publish the contents of the low-level technology data model stored on Interface for Metadata Access Points (IF-MAP) server 26 to the control nodes 42 using the IF-MAP protocol.

In one example approach, analytics nodes 44 of VN controller 22 are used to collect, collate, and present analytics information for troubleshooting problems and for determining network usage. In one such example approach, each component of network 8 generates detailed event records for significant events in the system. These event records may be sent to one of multiple instances (for scale-out) of the analytics node 44 that collate and store the information in a horizontally scalable database using a format that is optimized for time-series analysis and queries. The analytics nodes 44 may also include mechanisms to automatically trigger the collection of more detailed records when certain events occur, allowing VN controller 22 to get to the root cause of any issue without having to reproduce it. In one example approach, analytics nodes 44 also provide a northbound analytics query REST API that may be used by orchestrator 46 or automation interface 48 to retrieve analytics.

In one example approach, VN controller 22 is physically distributed but logically centralized. In one such example approach, VN controller 22 supports multiple redundant instances of any node. The redundant instance operate in an active-active mode (as opposed to an active-standby mode). By operating in an active-active mode VN controller 22 can continue to operate without any interruption when any given node fails. Furthermore, when a node becomes overloaded, additional instances of that node type may be instantiated and the load automatically redistributed. This prevents any single node from becoming a bottleneck and allows the system to manage very large-scale systems supporting tens of thousands of servers. Logically centralized means that VN controller 22 behaves as a single logical unit, despite the fact that it is implemented as a physically distributed cluster of multiple nodes.

In one example approach, configuration nodes 40 provide a discovery service that clients can use to locate the service providers (i.e. other nodes providing a particular service). For example, when the vRouter agent 35 in a compute node 12 wants to connect to a control node 42 (or, in some cases, to an active-active pair of Control VM's 42) it uses service discovery to discover the IP address of the control node 42. In some such example approaches, clients use local configuration, DHCP or DNS to locate the service discovery server.

In one example approach, virtual network controller 22 implements three basic building blocks: multi-tenancy, gateway functions and service chaining. Multi-tenancy, also known as network virtualization or network slicing, is the ability to create virtual networks that provide closed user groups to sets of VMs 36. Gateway functions refer to the ability to connect virtual networks to physical networks via a gateway router (for example, the Internet) and the ability to attach a non-virtualized server or networking service to a virtual network via a gateway (such as gateway 52 of FIG. 3A). Service chaining, also known as NFV, is the ability to steer flows of traffic through a sequence of physical or virtual network services such as firewalls, DPI, or load balancers.

In one example approach, the physical routers and switches of the underlay network do not contain any per-tenant state. That is, they do not contain Media Access Control (MAC) addresses, IP address, or policies for the virtual machines 36. The forwarding tables of the underlay physical routers and switches only contain the IP prefixes or MAC addresses of the physical servers 12. Gateway routers or switches that connect a virtual network to a physical network do, however, contain tenant MAC or IP addresses.

In one such example approach, vRouters 30 do contain per tenant state. They contain a separate forwarding table (a routing-instance) per virtual network. That forwarding table contains the IP prefixes (in the case of a layer 3 overlays) or the MAC addresses (in the case of layer 2 overlays) of the virtual machines 36. No single vRouter 30 needs to contain all IP prefixes or all MAC addresses for all virtual machines 36 in the entire data center 10. A given vRouter 30 may only need to contain those routing instances that are locally present on the server 12 (i.e. which have at least one virtual machine present on server 12.)

In some example approaches, orchestrator 46 automates the provision of services in the software-defined network. In some such example approaches, orchestrator 46 may, for instance, receive a request from a customer 11 for the addition and provisioning of a new virtual server, may analyze the network configuration and may then implement the configuration change via the VN controller 22. Orchestrator 46 may also update a billing system noting the added services for the customer. Representative orchestrators include Openstack, Kubernetes, Openshift and vCenter.

In some example approaches, automation interface 48 uses scripts and other automation tools to reduce the operational workload of configuring, troubleshooting and managing the physical and virtual devices of system 10. In some such example approaches, automation takes the form of Python or Perl scripts used to perform a specific or narrow set of functions. In other such example approaches, more complex automation tools such as Ansible and Puppet may be used. Ansible is a provisioning, configuration and deployment tool that relies on playbooks to define sequences of tasks. Puppet is a configuration management tool used to simplify the defining of IT infrastructure as code and the enforcement of system configurations. In one example approach, VN controller 22 includes its own automation interface (similar to, for instance, automation interface 48) that is accessible via user interface 45. In one such example approach, user interface 45 is a graphical user interface (GUI) built using the REST APIs 43 to communicate with the automation interface of VN controller 22.

Figure 3B:
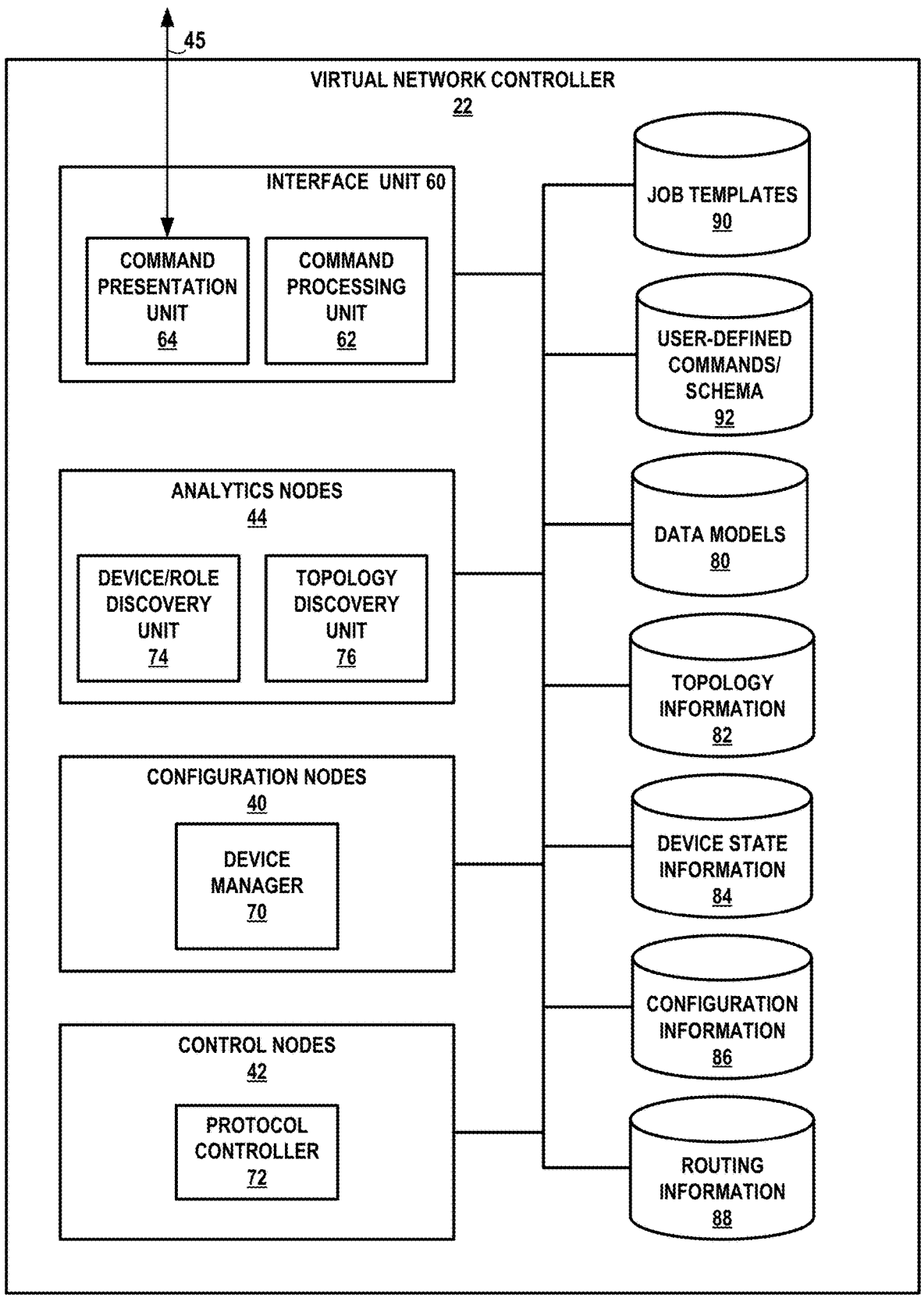
FIG. 3B is a block diagram illustrating an example approach to the virtual network controller of FIG. 3A, in accordance with one or more techniques of the disclosure.

FIG. 3B is a block diagram illustrating an example approach to the virtual network controller of FIG. 3A, in accordance with one or more techniques of the disclosure. In the example shown in FIG. 3B, virtual network controller 22 includes one or more configuration nodes 40, one or more control nodes 42, one or more analytics nodes 44 and an interface unit 60 connected to user interface 45. Node instances 40, 42, 44 may be implemented in physical servers 12 or on virtual machines 36. In one such example approach, configuration nodes 40 in virtual network controller 22 configure the control nodes 42 via a technology data model stored on Interface for Metadata Access Points (IF-MAP) server 26 shown in FIG. 2.

In some examples, virtual network controller 22 may include one or more controller devices that are included in a network, where the one or more controller devices include, individually and/or collectively, at least one processor comprising processing circuitry (not shown in FIG. 3B). This processing circuitry may, in some cases, execute software instructions, such as those used to define one or more software or computer programs, stored to a computer-readable storage medium (not shown in FIG. 3B), such as non-transitory computer-readable mediums including a storage device or a memory that stores instructions to cause the one or more processors to perform the techniques described herein. Alternatively, or additionally, the at least one processor may comprise dedicated hardware (e.g., one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware) for performing the techniques described herein.

As illustrated in FIG. 3B, virtual network controller 22 includes an interface unit 60, one or more analytics nodes 44, one or more configuration nodes 40, and one or more control nodes 42. In general, each of interface unit 60, analytics nodes 44, configuration nodes 40, and control nodes 42 may be implemented as software, hardware, firmware, or any combination thereof, and may be distributed across one or more hardware computing platforms that provide an environment for implementation of these units (e.g., distributed across one or more control devices in a network). Moreover, each of each of interface unit 60, analytics nodes 44, configuration nodes 40, and control nodes 42 may maintain state data, which may be stored within a centralized or distributed database.

For example, as illustrated in FIG. 3B, virtual network controller 22 includes various data stores or databases, which as noted above, may be stored centrally or in a distributed fashion across the nodes of virtual network controller 22. These data stores include data models 80, topology information 82, device state information 84, configuration information 86, and routing information 88. Analytics nodes 44, configuration nodes 40, interface unit 60, and control nodes 40 are all communicatively coupled to data models 80, topology information 82, device state information 84, configuration information 86, and routing information 88. In one example approach, the data stores further include job templates 90 and user-defined command/schema 92. Analytics nodes 44, configuration nodes 40, and interface unit 60, and control nodes 40 are all communicatively coupled to include job templates 90 and user-defined command/schema 92. In one example approach, each user-defined device-independent command includes one or more of input schema, output schema and input_ui schema as further defined below.

In some example approaches, interface unit 60 uses scripts and other automation tools to reduce the operational workload of configuring, troubleshooting and managing the physical and virtual devices of system 10. In some such example approaches, automation takes the form of Python or Perl scripts used to perform a specific or narrow set of functions. In other such example approaches, more complex automation tools such as Ansible and Puppet may be used. In one example approach, VN controller 22 includes a command processing unit 62 used to compile and execute user-defined device-independent commands via configuration nodes 40 or analytics nodes 44. In some such example approaches command presentation unit 64 operates in conjunction with command processing unit 62 to present users with a framework for defining and executing such user-defined device-independent commands. In one such example approach, user interface 45 is a graphical user interface (GUI) built using the REST APIs 43 to communicate with the command presentation unit 64 of VN controller 22.

In one example approach, command presentation unit 64 presents a data-model driven framework, that is rendered through UI 45 (without any hard-coding) for the user to invoke generic (device-independent) operations on a set of devices. In one such example approach, the framework uses standard data models and opensource tools, such as Ansible and Jinja2 (Jinja2 is a templating language for Python), and leverages the capabilities of VN controller 22 and UI 45 to render, via command presentation unit 64, generic operations that the user can customize and execute on selected network devices, to receive, via command presentation unit 64, the results and to render the results on UI 45 through a data model driven approach.

In one example approach, user interface 60 displays, via user interface 45, network devices that support a device-independent command selected from one or more device-independent commands, wherein each device-independent command performs one or more operations on supported network devices; receives, via user interface 45, user input selecting two or more of the displayed network devices, wherein each network device has a network device family, wherein one of the two or more selected network devices is from a first device family and responds to a first set of device commands associated with the first network device family and wherein another of the two or more selected network devices is from a second device family and responds to a second, different, set of device commands associated with the second network device family; and performs the one or more operations of the selected device-independent command on the selected network devices, wherein performing the one or more operations includes executing, on each selected network device, tasks based on commands from the command set associated with the network device family of the respective selected network device, wherein the tasks, when executed, perform the one or more operations on the respective selected network device. In one example approach, the command sets are collections of command line interface (CLI) commands associated with device families and/or device vendors.

In one example approach, command processing unit 62 renders the user-defined device-independent command and forwards instructions to one of configuration nodes 40 and analytics nodes 44 for execution. In one such example approach, results are returned to command processing unit 64 for presentation to the user.

This idea decouples completely the need for device-specific operations/commands and their associated user interface dependencies. Generic operations rely on input and output data models which are dynamically rendered via command processing unit 62. Moreover, such operations leverage the concept of role-based and profile-based device management to decouple configuration and operation functionality from hardcoded software). This framework may, therefore, be used to automate a single operation across multiple device vendors, providing the user a consistent view of the results (irrespective of the vendor-specific output/data each vendor:device model provides).

In some example approaches, configuration nodes 40 include one or more device managers 70 that provide a management layer used to configure control nodes 42. In some example approaches, instantiated services are represented by objects in a horizontally scalable database that is described by a formal service data model stored in data model store 80. In some example approaches, device manager 70 also includes the transformation engine described above in the discussion of FIG. 3A. As noted above, the transformation engine may be used to transform objects in the high-level service data model into corresponding lower-level objects in the technology data model.

In one example approach, control nodes 42 implement the logically centralized portion of the control plane. In one example approach, objects describing instantiated services are defined via a formal service data model. In such one example approach, the formal service data model is a high-level service data model used to describe the services that need to be implemented; each high-level service data model has an associated low-level technology data model that describes how those services need to be implemented. Each data model consists of a set of objects, their capabilities, and the relationships between them. The data models are stored in data model store 80.

In one example approach, each formal service data model may be converted into a low-level technology data model describing how the services are to be implemented. In one such example approach, configuration nodes 40 in virtual network controller 22 transform any change in a high-level service data model to a corresponding set of changes in the corresponding low-level technology data model. Configuration nodes 40 may then publish the contents of the low-level technology data model stored on Interface for Metadata Access Points (IF-MAP) server 26 to the control nodes 42 using the IF-MAP protocol.

In some example approaches, configurations nodes 40 further include an intent and policy engine (not shown) configured to determine network state, to compare the current network state against a desired network state and to drive configuration changes to network devices 12, 16, 18 to achieve the desired network state. One example intent and policy engine is described in NETWORK DEVICE CONFIGURATION USING A MESSAGE BUS, U.S. patent application Ser. No. 16/221,698, filed Dec. 17, 2018, the description of which is incorporated herein by reference.

In some example approaches, configuration nodes 40 further include a maintenance mode controller (not shown). One example maintenance mode controller is described in AUTOMATION OF MAINTENANCE MODE OPERATIONS FOR NETWORK DEVICES, U.S. patent application Ser. No. 16/230,156, filed Dec. 21, 2018, the description of which is incorporated herein by reference.

In general, analytics nodes 44 is tasked with collecting, storing, correlating, and analyzing information from virtual and physical network elements and/or devices within a data center (e.g., data center 10). This information may include statistics, logs, events, and/or errors for use in managing the routing and network configuration of the data center. Analytics nodes 44 may store this information in one or more of topology information 82, device state information 84, configuration information 86, and/or routing information 88. Interface unit 60 may be configured to provide a communication interface to one or more entities external to virtual network controller 22, such as to administrator 24 (FIG. 1), user interface 45 (FIG. 3A), automation interface 48 (FIG. 3A) and/or orchestrator 46 (FIG. 3A). In some examples, analytics nodes 44 may provide collected information, and/or any information stored in topology information 82, device state information 84, configuration information 86, or routing information 88 to interface unit 60, which may output such information to one or more external entities, such as administrator 24 or orchestrator 46.

In some examples, interface unit 60 may provide any of such information to administrator 24 via a portal application, which may be included in or coupled to interface unit 60. The portal application may provide user interface functionality through which the user can provide input to and receive output from the portal application. For example, interface unit 60 may output the log and/or state information to the user via this portal application, such that the user may be informed of such information (e.g., before, during, and/or after particular operations are performed).

As illustrated in FIG. 3B, analytics nodes 44 includes a device/role discovery unit 74, and a topology discovery unit 76. Topology discovery unit 76 may be configured to collect, store, correlate, and analyze topology information from the network and fabric, which may be stored in topology information 82. For example, in reference to the example of FIG. 1, topology discovery unit 76 may collect and determine topology information associated with switch fabric 14 of network 8 in data center 10, such as the particular topology of chassis switches 18 and TOR switches 16, and this information may be stored in topology information 82. Over time, as network devices 12, 16, 18 are added or removed from corresponding networks, topology discovery unit 76 operates to determine the updated topology information and/or changes, which may be stored in topology information 82.

Device/role discovery unit 74 may be configured to collect or retrieve information from the particular network devices 12, 16, 18 that are in a network at a given period of time, as well as the roles of these devices. As noted above, over time, individual network devices may be added or removed from the network (e.g., network 10 of FIG. 1). Device/role discovery unit 74 is configured to identify whether devices have been added or removed, as well as to identify device information that is associated with these devices. Device/role discovery unit 74 may store such information in topology information 82 and/or device state information 84. Device/role discovery unit 74 may also store device role information (e.g., whether a device is a spine or leaf device, whether a device is a chassis switch/TOR switch/router/etc.) in topology information 82 and/or device state information 84.

Configuration nodes 40 of virtual network controller 22 may be configured to configure one or more of the network devices within a network (e.g., in network 100 of FIG. 1 and/or network 200 of FIG. 2). Configuration nodes 40 may access any of data models 80, topology information 82, device state information 84, configuration information 86, and/or routing information 334 when configuring the network devices. Configuration nodes 40 may also store any information, including configuration information, in any of these data stores. In some examples, configuration nodes 40 present a northbound application programming interface (API) that interface with orchestration engine 213 (FIG. 2), such as via interface unit 60.

In certain examples, configuration nodes 40 may selectively configure the fabric beforehand (e.g., based on the network topology and/or state), such as when network devices within the fabric (e.g., network devices of fabric 14 of FIG. 1) are initially brought under the management scope of network controller 22. At this preliminary stage, configuration nodes 40 may inject certain configurations into the network devices (e.g., a combination of underlay routing protocols policies and overlay routing protocols policies). In some cases, specific standard protocol extensions (e.g., AS-PATH in case of underlay Border Gateway Protocol (BGP)) are configured and kept temporarily inactive, e.g., as part of the underlay configuration of these devices. Then, prior to initiating the performance of maintenance mode operations on the network devices, configuration nodes 40 may activate the previously injected configurations on these devices, allowing traffic to be diverted from devices that undergo such operations (e.g., software upgrades). In various examples, configuration information may include routing instance and/or forwarding policy information.

As discussed above, virtual network controller 22 includes one or more control nodes 42. Control nodes 42 may implement a logically centralized control plane responsible for maintaining network state. Control nodes 42 interact with network elements, such as the network devices shown in FIG. 1, to ensure that the network state is eventually consistent with desired state as specified by an orchestration engine (e.g., orchestration engine 213). In some examples, control nodes 42 receive configuration state information of virtual network controller 22 from device configuration unit 338. Further, control nodes 42 exchange routes with VN agents (e.g., VN agents 35 on servers 12, as shown in FIG. 2) via XMPP. Control nodes 42 also communicate the configuration state information, such as routing instances and forwarding policy, to VN agents (e.g., VN agents 35), via, e.g., XMPP, for installation within respective virtual routers 30. In some examples, control nodes 42 may proxy traffic on behalf of servers (e.g., servers 12 in FIG. 2). These proxy requests may be received over XMPP. XMPP is described in further detail in P. Saint-Andre, Extensible Messaging and Presence Protocol (XMPP): Core, IETF RFC 6120, March 2011, the entire contents of which is incorporated by reference herein.

Further, control nodes 42 may exchange routes with a gateway (e.g., gateway 52 of FIG. 3A) via BGP, and exchange the configuration state of virtual network controller 22 with network devices in a fabric (e.g., switch fabric 14 in FIGS. 1 and 2) via NETCONF. As described above, the functions provided by maintenance mode controller 315 may be part of configuration nodes 40, control nodes 42, or a combination thereof, which have access to configuration information 86.

As shown in FIG. 3B, control nodes 72 include a protocol controller 72, which is capable of controlling communication between virtual network controller 22 and other devices, agents, entities, and the like via one or more communication protocols, such as for example, an XMPP protocol, a NET CONF protocol, a BGP protocol, and/or an IF-MAP protocol, to list a few examples.

In some examples, control nodes 42 receive configuration state from maintenance mode controller 315 using IF-MAP. Control nodes 42 may include one or more control nodes that exchange routes with other control nodes using IBGP to ensure that all control nodes have the same network state. As described above, control nodes 42 exchange routes with the VN agents 35 on the compute nodes (e.g., servers 12) using XMPP. Control nodes 42 may also use XMPP to send configuration state such as routing instances and forwarding policy.

Control nodes 42 also exchange BGP messages with BGP peers, including any network devices configured to communicate via BGP, and also including any gateway nodes (e.g., gateway 52 shown in FIG. 3A). Protocol controller 72 may store routing information associated with any devices in the network, including compute nodes (e.g., servers 210 shown in FIG. 2), in routing information 88.

Figure 3C:
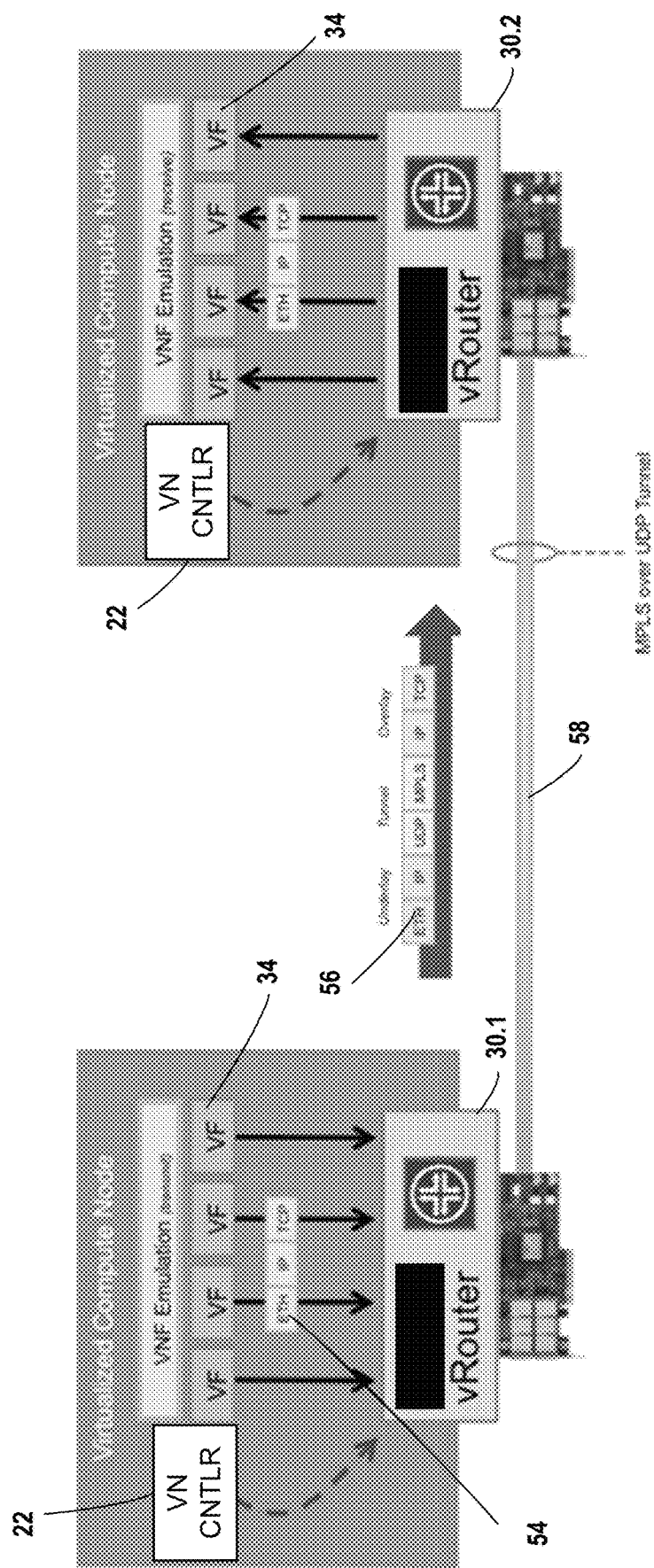
FIG. 3C is a block diagram illustrating tunnel communications in the software-defined network of FIG. 3A.

FIG. 3C is a block diagram illustrating communications in the software-defined network of FIGS. 3A and 3B. In one example approach, virtual network controller 22 distributes device commands corresponding to the device-independent commands initiated as described in the context of FIG. 3B to network devices 12, 16 and 18. In addition, in the example approach of FIG. 3C, virtual network controller 22 configures vRouters 30.1 and 30.2 such that virtual machines 36 connected to vRouter 30.1 communicate with virtual machines 36 connected to vRouter 30.2. In some example approaches, end-to-end encryption is provided via a tunnel mechanism such as MPLS over GRE, MPLS over UDP or VXLAN. As can be seen in FIG. 3C, in one example approach, IP packets 54 transferred across virtual fabric 34 are encapsulated using the MPLS over UDP protocol before being transmitted as encapsulated IP packets 56 via a tunnel 58 across a physical network.

In some such example approaches, encapsulation is performed as a service on a service chain, or by a dedicated encryption device or firewall. Packets may, therefore, move unencrypted between physical cards within a server 12 or across a subnet 17 until they arrive at the node that performs the encryption. At times, however, it is desirable to provide virtual router to virtual router end-to-end encryption as a means to secure multi-tenant traffic that egresses a vRouter 30. For example, tenants may need to run applications while remaining compliant with the PCI DSS (Payment Card Industry Data Security Standard). They may, therefore, require the use of highly secure cryptographic algorithms to encrypt the headers and payload of the IP packets. They may also need network multi-tenancy with locked down routing tables with only specific routes to endpoints governed by stringent policy frameworks. One approach for encapsulating packets before they are transmitted on the underlay network is described in U.S. patent application Ser. No. 16/146,713, the description of which is incorporated herein by reference.

Figure 4:
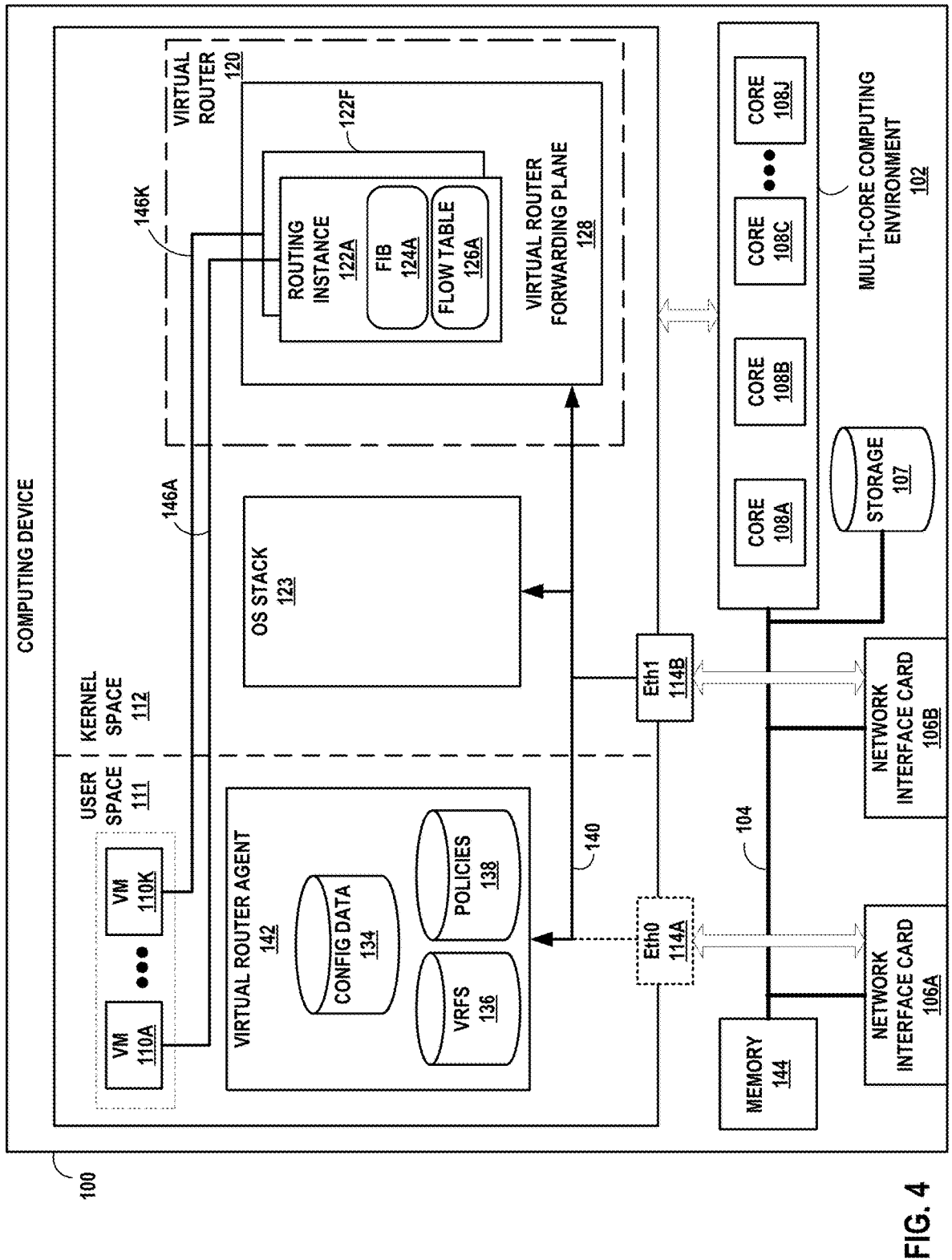
FIG. 4 is a block diagram illustrating a computing device that executes an example virtual router for virtual networks according to techniques described herein.

FIG. 4 is a block diagram illustrating a computing device that executes an example virtual router for virtual networks according to techniques described herein. Computing device 100 may represent any of servers 12 of FIGS. 1-2 or other devices, such as any of TOR switches 16. In the example approach of FIG. 4, computing device 100 includes a system bus 104 coupling hardware components of a computing device 100 hardware environment. System bus 104 connects memory 144, network interface cards (NICs) 106A-106B (collectively, "NICs 106"), storage 107, and a multi-core computing environment 102 having a plurality of processing cores 108A-108J (collectively, "processing cores 108"). Network interface cards 106 include interfaces configured to exchange packets using links of an underlying physical network. Multi-core computing environment 102 may include any number of processors and any number of hardware cores from, for example, four to thousands. Each of processing cores 108 each includes an independent execution unit to perform instructions that conform to an instruction set architecture for the core. Processing cores 108 may each be implemented as separate integrated circuits (ICs) or may be combined within one or more multi-core processors (or "many-core" processors) that are each implemented using a single IC (i.e., a chip multiprocessor).

Storage 107 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by cores 108.

Memory 144 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Memory 144 provides a physical address space composed of addressable memory locations.

Memory 144 may in some examples present a non-uniform memory access (NUMA) architecture to multi-core computing environment 102. That is, cores 108 may not have equal memory access time to the various storage media that constitute memory 144. Cores 108 may be configured in some instances to use the portions of memory 144 that offer the lowest memory latency for the cores to reduce overall memory latency.

In some instances, a physical address space for a computer-readable storage medium may be shared among one or more cores 108 (i.e., a shared memory). For example, cores 108A, 108B may be connected via a memory bus (not shown) to one or more DRAM packages, modules, and/or chips (also not shown) that present a physical address space accessible by cores 108A, 108B. While this physical address space may offer the lowest memory access time to cores 108A, 108B of any of portions of memory 144, at least some of the remaining portions of memory 144 may be directly accessible to cores 108A, 108B. One or more of cores 108 may also include an L1/L2/L3 cache or a combination thereof. The respective caches for cores 108 offer the lowest-latency memory access of any of the storage media for the cores 108.

Memory 144, network interface cards (NICs) 106A-106B (collectively, "NICs 106"), storage 107, and multi-core computing environment 102 provide an operating environment for a software stack that executes a virtual router 120 and one or more virtual machines 110A-110K (collectively, "virtual machines 110") connected through tap interfaces 146A-146K (collectively, "tap interfaces 146") to routing instances 122A-122F (collectively, "routing instances 122"). Virtual machines 110 may represent example instances of any of virtual machines 36 of FIG. 2. Virtual router 120 may represent example instances of any of vRouters 30 of FIGS. 1, 2, 3A and 3B. The computing device 100 partitions the virtual and/or physical address space provided by main memory 144 and in the case of virtual memory by a combination of memory 144 and storage 107 into user space 111, allocated for running user processes, and kernel space 112, which is protected and generally inaccessible to user processes.

Memory 144, network interface cards (NICs) 106A-106B (collectively, "NICs 106"), storage 107, and multi-core computing environment 102 may also provide an operating environment for an operating system kernel executing in kernel space 112. The operating system kernel may include, for example, a Linux, Berkeley Software Distribution (BSD), another Unix-variant kernel, or a Windows server operating system kernel, available from Microsoft Corp. The operating system kernel implements an operating system networking stack 123 in kernel space 112 as shown in FIG. 4.

As further explained below, in some example implementations, kernel space 112 may be configured with multiple network stacks, which may be beneficial when implementing virtual networking on top of an underlying physical network. For example, as further described, operating system network stack 123 may represent a first software network stack executing in kernel space 112 while virtual router 120 may implement its own corresponding software network stack, where each network stack implements corresponding functionality for network layers (e.g., layers 1-3 of the OSI model). In some examples, computing device 100 may be configured to use an IPVLAN driver to transfer packets between different network stacks operating within the same kernel module (e.g., kernel space 112) of computing device 100. That is, an IPVLAN driver may be installed and configured to operate as a packet transport having endpoints configured on different network stacks within the same kernel space of computing device 100.

Computing device 100 may in some instances execute a hypervisor to manage virtual machines 110 (not shown in FIG. 4). An example hypervisor 31 is illustrated in FIG. 2. Example hypervisors include Kernel-based Virtual Machine (KVM) for the Linux kernel, Xen, ESXi available from VMware, Windows Hyper-V available from Microsoft, and other open-source and proprietary hypervisors. In some examples, specialized hardware programmed with routing information such as forwarding information base (FIB) 124 may execute aspects of virtual router 120.

Eth0 114A and Eth1 114B represent devices according to a software device model and provide device driver software routines for handling packets for receipt/transmission by corresponding NICs 106. Packets received by NICs 106 from the underlying physical network fabric for the virtual networks may include an outer header to allow the physical network fabric to tunnel the payload or "inner packet" to a physical network address for one of NICs 106. The outer header may include not only the physical network address but also a virtual network identifier such as a VxLAN tag or Multiprotocol Label Switching (MPLS) label that identifies one of the virtual networks as well as the corresponding routing instance 122. An inner packet includes an inner header having a destination network address that conform to the virtual network addressing space for the virtual network identified by the virtual network identifier. For example, virtual router forwarding plane 128 may receive by Eth1 from NIC 106 a packet having an outer header than includes a VxLAN associated in virtual router forwarding plane 128 with routing instance 122A. The packet may have an inner header having a destination network address that is a destination address of VM 110A that taps, via tap interface 146A, into routing instance 122A.

Virtual router 120 in this example includes a kernel space 112 module: virtual router forwarding plane 128, as well as a user space 111 module: virtual router agent 142. Virtual router forwarding plane 128 executes the "forwarding plane" or packet forwarding functionality of the virtual router 120 and virtual router agent 142 executes the "control plane" functionality of the virtual router 120. Virtual router agent 142 may represent an example instance of any of VN agents 35 of FIG. 2.

Virtual router forwarding plane 128 includes multiple routing instances 122A-122F (collectively, "routing instances 122") for corresponding virtual networks. In the example shown in FIG. 4, each routing instance 122 includes a forwarding information base (FIB) 124 and a flow table 126. Although illustrated as separate data structures within each routing instance 122, flow tables 126 may in some instances be logical tables implemented as a single table or other associative data structure in which entries for respective flow tables 126 are identifiable by the virtual network identifier (e.g., a VRF identifier such as VxLAN tag or MPLS label)). FIBs 124 may include lookup tables that map destination addresses to destination next hops. The destination addresses may include layer 3 network prefixes or layer 2 MAC addresses. Flow tables 126 may also enable application of forwarding policies to flows. In one example approach, each of flow tables 126 include flow table entries that match one or more flows that may traverse virtual router forwarding plane 128 and include a forwarding policy for application to matching flows. In one example approach, for instance, virtual router forwarding plane 128 attempts to match packets processed by routing instance 122A to one of the flow table entries of flow table 126A. If, in this example, a matching flow table entry exists for a given packet in flow table 126A, virtual router forwarding plane 128 applies the flow actions specified in a policy to the packet. This may be referred to as "fast-path" packet processing. If a matching flow table entry does not exist for the packet in flow table 126A, the packet may represent an initial packet for a new packet flow; virtual router forwarding plane 128 may in that case request virtual router agent 142 to install a flow table entry in flow table 126A for the new packet flow via link 140. This may be referred to as "slow-path" packet processing for initial packets of packet flows.

In one example approach, virtual router agent 142 is a user space 111 process executed by computing device 100. Virtual router agent 142 includes configuration data 134, virtual routing and forwarding instances configurations 136 ("VRFs 136"), and policy table 138 ("policies 138"). In one example approach, virtual router agent 142 exchanges control information with one or more VN controllers 22. Control information may include virtual network routes and low-level configuration state (such as routing instances and forwarding policy) for installation to configuration data 134, VRFs 136, and policies 138. Virtual router agent 142 may also report analytics state, install forwarding state to FIBs 124 of virtual router forwarding plane 128, and discover VMs 110 and their attributes. As noted above, virtual router agent 142 may further apply slow-path packet processing for the first (initial) packet of each new flow traversing virtual router forwarding plane 128 and may install corresponding flow entries to flow tables 126 for the new flows for fast path processing by virtual router forwarding plane 128 for subsequent packets of the flows.

In one example approach, as noted above, virtual router 120 is a kernel module that is loaded in the kernel 112 while the host operating system loads an IP framework for transforming packets for IPSec module 125 at startup. In one such example approach, IPSec module 125 implements IPSec with IKEv2, certification management for IKEv2, AES—GCM 256 crypto and AES-NI. In one Linus-based approach, the operating system loads XFRM (the Linux IP framework for transforming packets) at startup. In one example approach, IPSec is configured in full mesh, tunnel mode, across the network 8 connecting the virtual routers 120 with each other.

In one example approach, overlay IP-packets on the transmit (TX) path are sent from the virtual router 120 to IPSec module 125 for encryption. IP-packets with ESP (Encapsulating Security Payload) are then returned to virtual router 120 for forwarding by the virtual router.

In one example approach, virtual router 120 creates the IP/MPLS or VXLAN packet for tenant application with proper L2 and L3 headers for source and destination and writes the packets to IPSec module 125 via an IPSec interface 127. An IPSec kernel executing in IPSec module 125 traps the packets based on the states and policy that would be provisioned as part of the IPSec module bringing up of the connection. Based on the policy matching the IP address in the packet, XFRM transforms and encrypts the entire IP packet using ESP (Encapsulated Security Payload), ensuring the authentication, integrity and confidentiality of the tenant traffic. Once the IPSec Kernel encrypts the packet, IPSec module 125 transfers the packet with IPSec Encapsulated Security Payload (ESP) to virtual router 120. Virtual router 120 receives the encapsulated packet and transmits the packet to the physical network.

At the receiving end, the encrypted packet reaches the destination virtual router 120. In one example approach, ESP packets on the receive (RX) side of virtual router 120 are sent up the OS networking stack 123 where the Linux kernel with IPSec configured decrypts the packet and writes the resulting MPLS/VxLAN packet to virtual router 120. In one example approach, virtual router 120 is configured to look for MPLS, VXLAN and GRE headers only. All other packets, including ESP packets, get transferred via the IPSec kernel interface 127 to IPSec module 125. In one example approach, IPSec module 125 reads the packets from the interface, decrypts the encrypted packets and transfers the decrypted IP packets to virtual router 120. In one example approach, IPSec kernel interface 127 includes a decrypt interface that is plumbed on both the OS networking stack and the virtual router stack 120 such that the decrypted packet, which is essentially the IP/MPLS or VXLAN packet, is read by virtual router 120 and sent to the appropriate tenant application interface based on a Label lookup. As noted above, packet processing happens in the kernel for IPSec module 125 and virtual router 120.

In one example approach, virtual network controller 122 includes an application interface (API) used to enable encryption on a per virtual router 120 or a per virtual router instance 122 basis. For example, all packets from tenant workloads traversing virtual router instances 122 may be configured to be encryption enabled in order to encrypt the packet. In one such example approach, virtual network controller 122 provides a graphical user interface (GUI) that allows an administrator to enable or disable encryption for secure forwarding of the tenant workloads on a virtual router instance basis.

Figure 5:
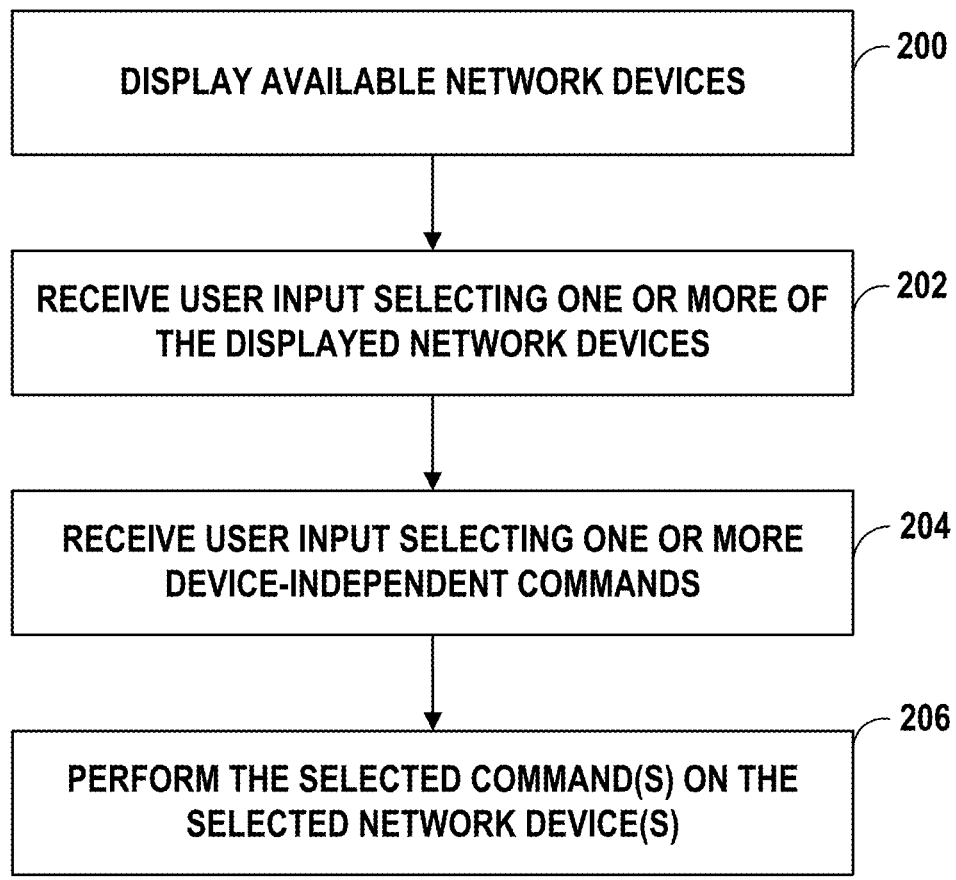
FIG. 5 is a flowchart illustrating an example approach for performing device-independent commands on network devices of the software-defined network of FIGS. 3A and 3B, in accordance with techniques described herein.

FIG. 5 is a flowchart illustrating an example approach for performing device-independent commands on network devices of the software-defined network of FIGS. 3A and 3B, in accordance with techniques described herein. In one example approach, VN controller 22 implements a data-model driven framework used to invoke generic operations on a set of network devices. Such operations may be used by a user or network administrator to define and execute operations on devices in data center 10 in a device agnostic manner. In one example approach, the framework is rendered through user interface (UI) 45 without hard-coding on the part of the user or network administrator, and without requiring the use by the user or by the network administrator of CLI commands. In some such example approaches, the framework employs standard data models, an extensible UI and automation tools, such as Ansible, in a data model driven approach that leverages the capabilities of VN controller 22 to perform generic operations on a selected set of network devices and to display the results of the operations on the user interface 45. The approach may be used, for example, to enable sales engineering to automatically run selected commands, such as get commands, from the user interface (UI) 45 on data center devices. Other, more complex, commands may also be implemented based on the techniques described herein. In some example approaches, device-independent commands are defined based on a job_template_type defined for each command (i.e., device_operation).

Such techniques eliminate the need for specific device operations/commands and remove user interface dependencies based on specific devices. Instead, generic operations rely on input and output data models, which may be rendered dynamically. In addition, in some example approaches, VN controller 22 uses role-based and profile-based device management to decouple config/operation functionality in each network device from specific generic operations. By leveraging the concept of role-based and profile-based device management, this framework can be used to automate a single operation across multiple device vendors, providing the user a consistent view of the results regardless of the vendor-specific output/data provided by specific vendor:device models.

In the example approach of FIG. 5, UI 45 displays within a graphical user interface indicia associated with one or more network devices 12, 16, 18 (200). A user selects one or more of the one or more network devices 12, 16, 18 via the indicia (202) and then selects one or more device-independent commands to perform on the selected network devices (204). VN controller 22 then performs the selected device-independent commands on the selected network devices (206).

In one example approach, the graphical user interface includes a generic device operation icon (e.g., a button) that, when activated, begins execution of a device-independent command on one or more network devices from network 8. In one such example approach, UI 45 displays a screen listing the generic device operation icon and a list of network devices configured for generic device operation. In some such example approaches, a user or administrator selects one or more network devices on the list of network devices and initiates generic device operation on the selected devices by clicking on the generic device operation icon. In one example approach, the execution of a single generic device operation command across each of the selected devices is treated as a single job execution, even if the devices are of different families or different vendors.

Figure 6A:
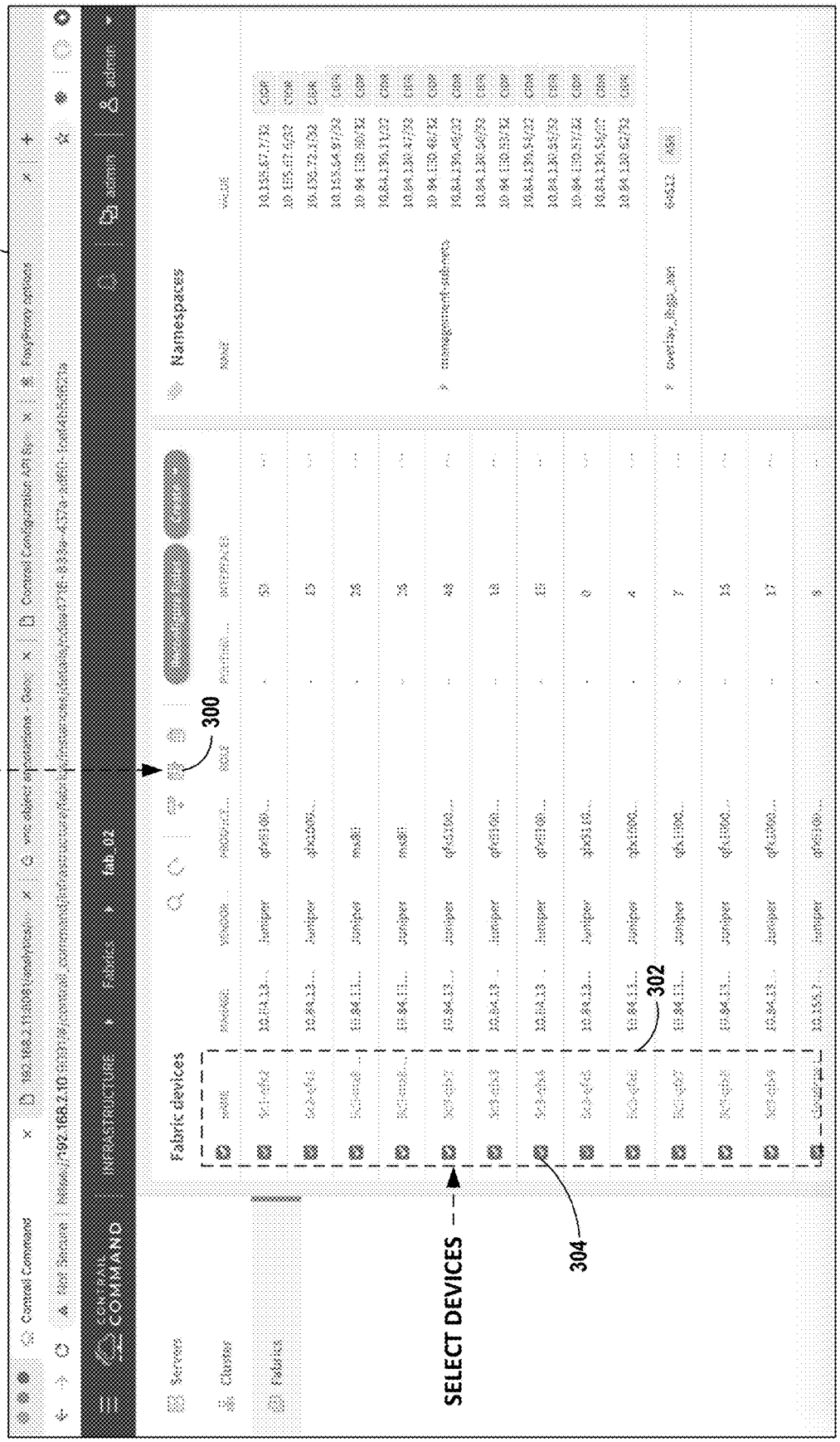
FIGS. 6A-6H illustrate a representative user interface for supporting device-independent commands, in accordance with techniques described herein.
Figure 6B:
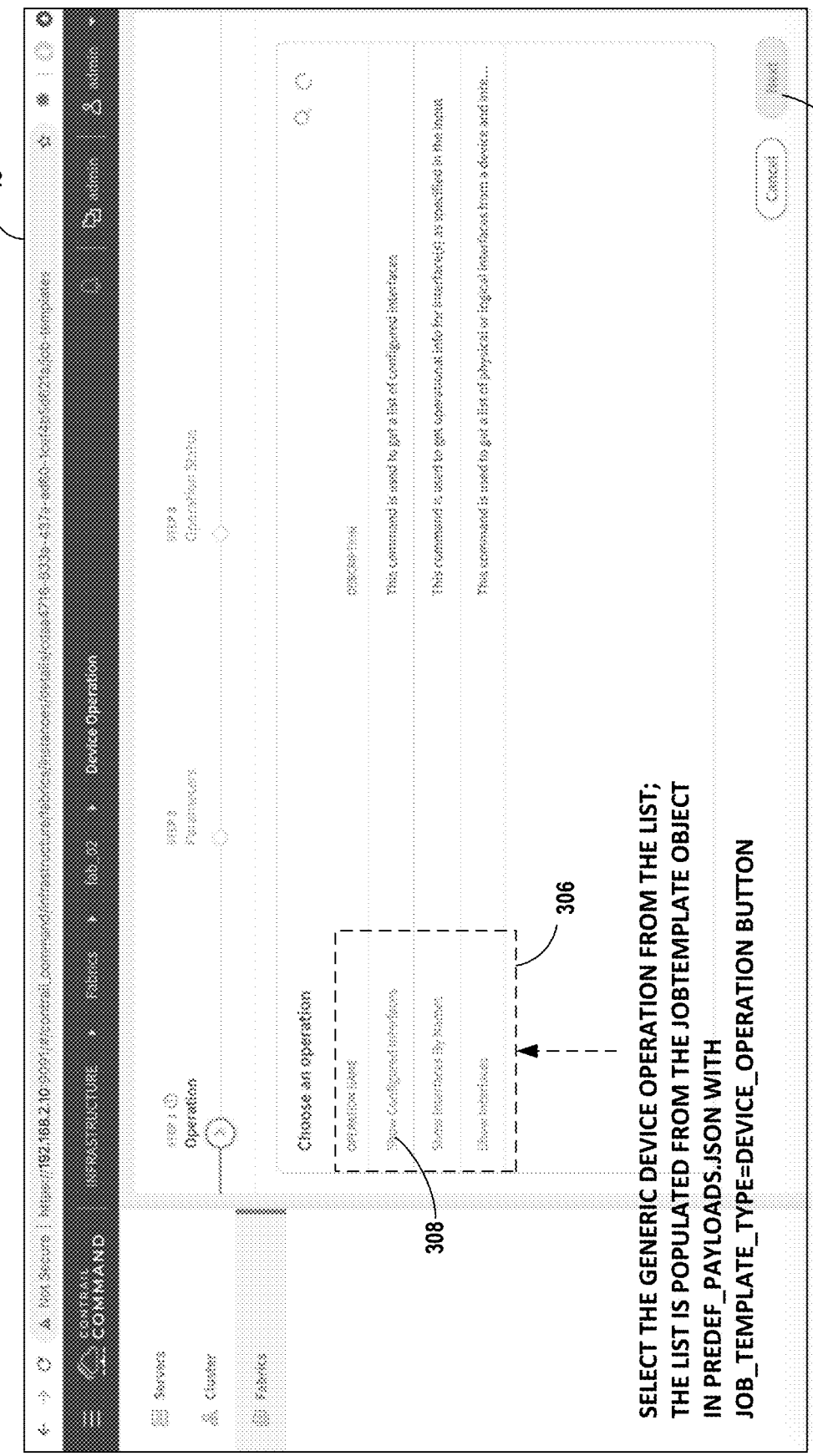
Figure 6C:
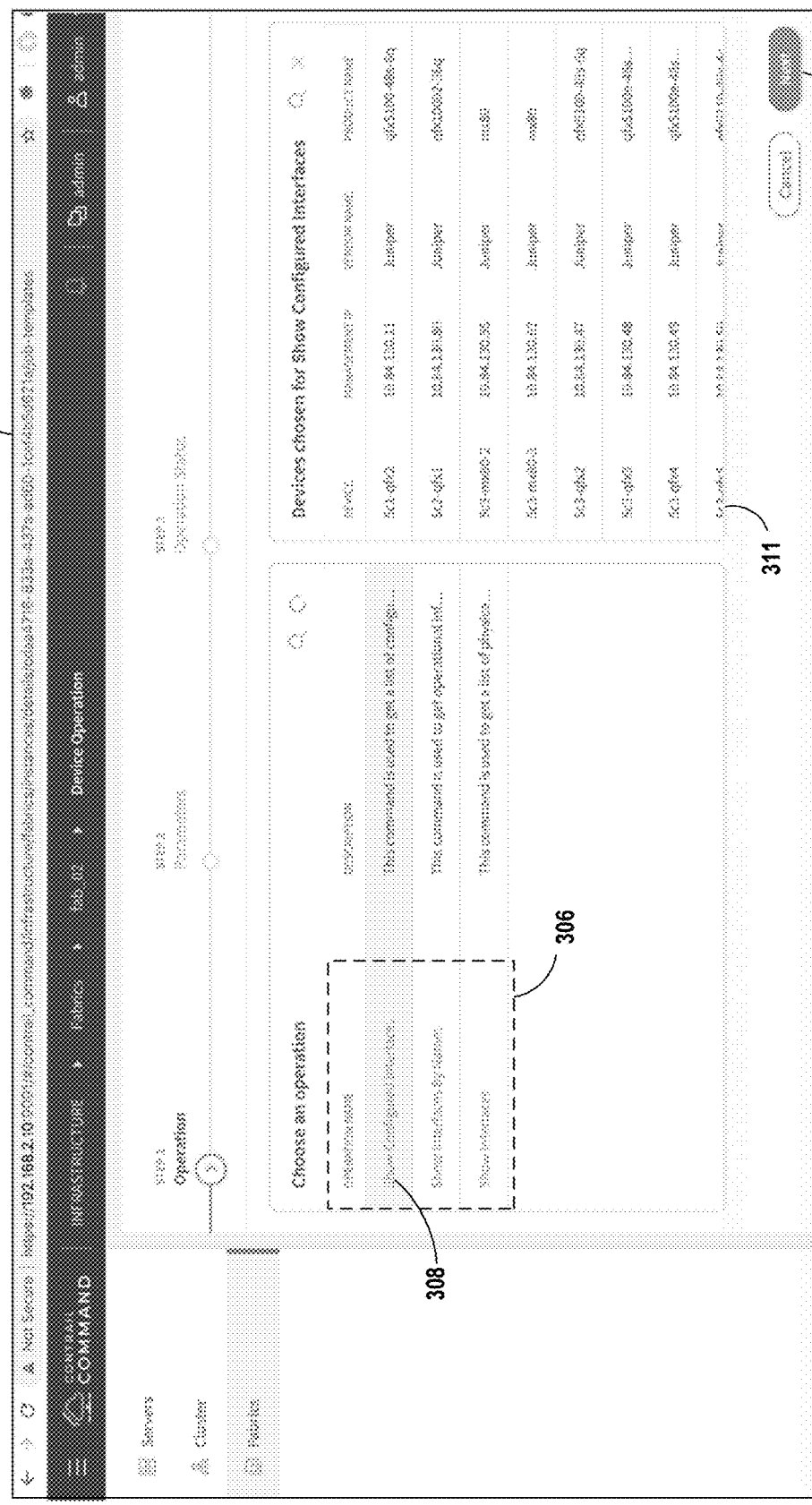

FIGS. 6A-6C illustrate a representative user interface for supporting device-independent commands, in accordance with techniques described herein. In the example approach of FIGS. 6A-6C, each device-independent command is a generic device operation. For instance, UI 45 in FIG. 6A displays a generic device operation button 300 and a list 302 of network devices 12, 16, 18. In the example approach of FIG. 6A, actuation of generic device operation button 300 performs a device-independent command. Network devices in list 302 may, in the example approach of FIG. 6A, be selected by clicking on a box 304 located to the left of the label identifying each network device. In some example approaches, other attributes associated with the network devices (such as IP address or vendor name) are listed with the device label. In some example approaches, clicking on button 300 leads to the display of the screen shown in FIG. 6B.

In the example approach illustrated in FIG. 6B, UI 45 displays a list 306 of available generic device operations 308 and an icon 310 (e.g., a button) associated with initiation of the selected device-independent command. In one example approach, there are a number of device-independent commands, each of which may be run as a separate job-execution. In one such example approach, the available device-independent commands are displayed via a drop-down menu in UI 45. That is, list 306 is displayed as a drop-down menu and can be used to select one or more of the available device-independent commands.

In some example approaches, a user selects one of the device-independent commands 308 (listed here as generic device operations) from list 306 and initiates execution of the operation by, for instance, clicking on icon 310. In some example approaches, clicking on icon 310 leads to the display of the screen shown in FIG. 6D.

In some example approaches, when the user selects one of the device-independent commands 308 from list 306, the selected command is highlighted as shown for the "Show Configured Interfaces" command of FIG. 6C and a list 311 of the devices chosen in FIG. 6A appears in a window to the right of the list 306 of available generic device operations 308. The user may then initiate execution of the operation by, for instance, clicking on icon 310 which, in turn, may lead to the display of the screen shown in FIG. 6D.

Figure 6D:
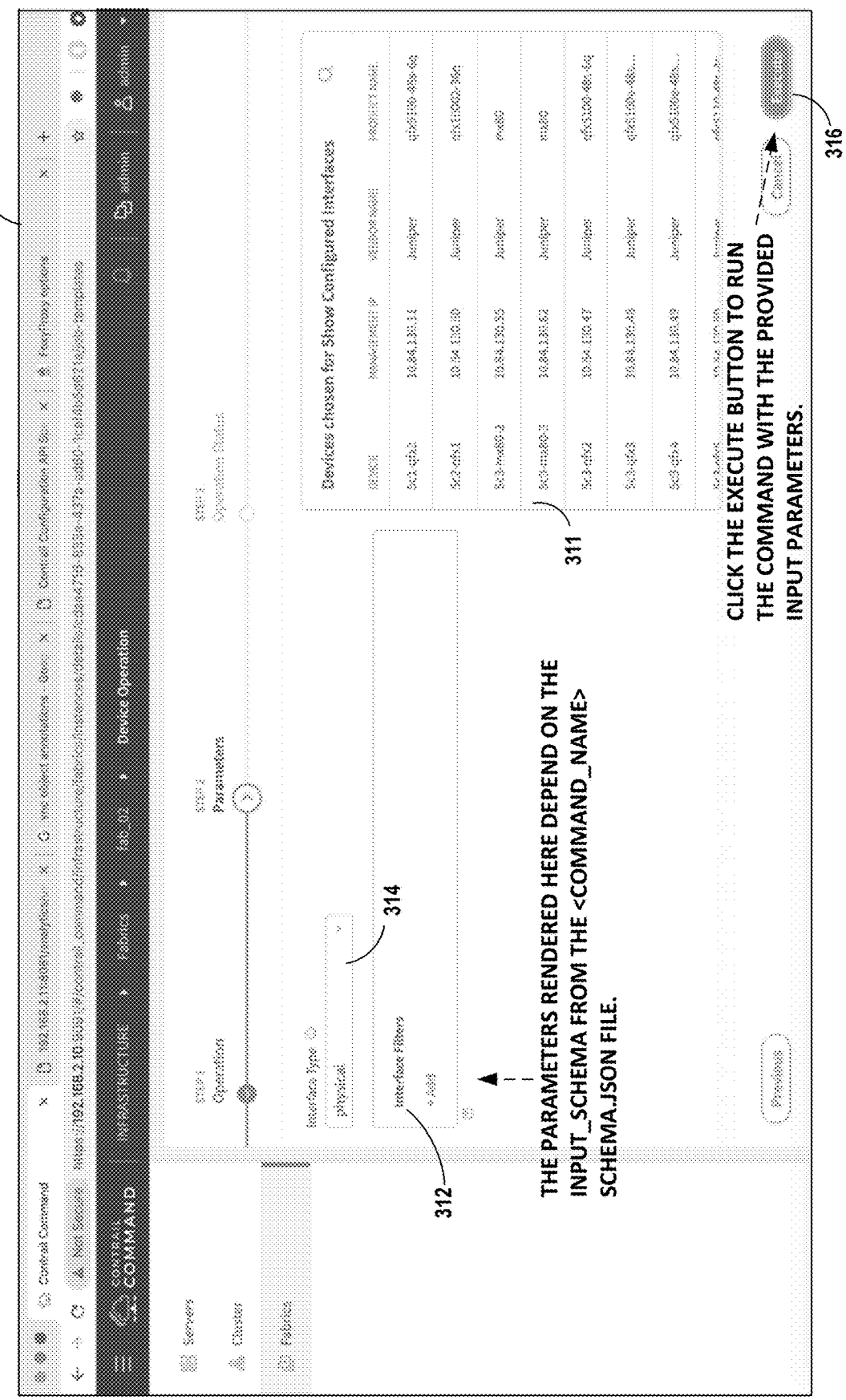

In the example approach illustrated in FIG. 6D, UI 45 displays one or more input parameters 312, 314 associated with the device-independent command selected in FIG. 6B. In one example approach, the parameters rendered depend on the input_schema from a schema file associated with the selected device-independent command. In the example shown in FIG. 6D, input parameter 312 is a parameter associated with interface filters while input parameter 314 is a parameter associated with interface type. In some such example approaches, UI 45 also displays the list 311 of the devices chosen in FIG. 6A in a separate window. In some example approaches, a user enters any needed parameters in a single parameters field (not shown) in parameter name: parameter attribute pairs.

Figure 6E:
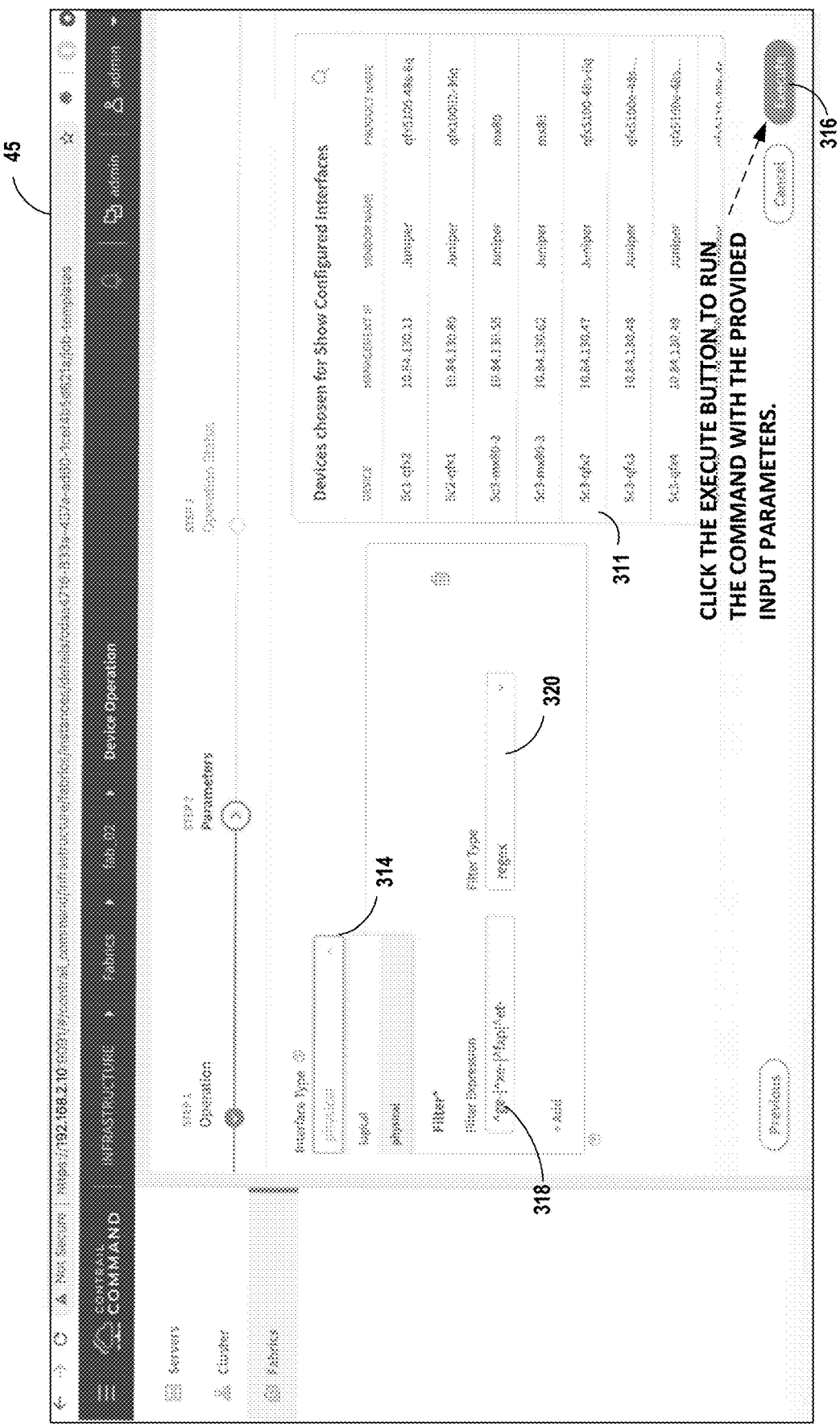

FIG. 6E illustrates an example approach in which input parameter 314 is a drop down menu used to select between interface types and in which selecting the "Add" positioned under parameter 312 in FIG. 6D allows a user to add filters appropriate for the device-independent command. In one example approach, as shown in FIG. 6E, selecting "Add" opens a window 318 for receiving a filter expression and a drop down menu 320 for selecting a filter type. The user begins execution of the selected device-independent command with its associated input parameters by clicking on execute icon 316.

In one example approach, each device-independent command job executes asynchronously in background and returns a prouter_uve object for each device. In some example approaches, when a device-independent command job is complete, a results page is displayed in UI 45 showing the command output for each network device selected. If there is an error in running the device-independent command on any of the selected network devices, the error is noted via a job logs summary message. In some such example approaches, the prouter_uve object for each selected network device carries the results of the operation for each device and is displayed in a results page within UI 45.

Figure 6F:
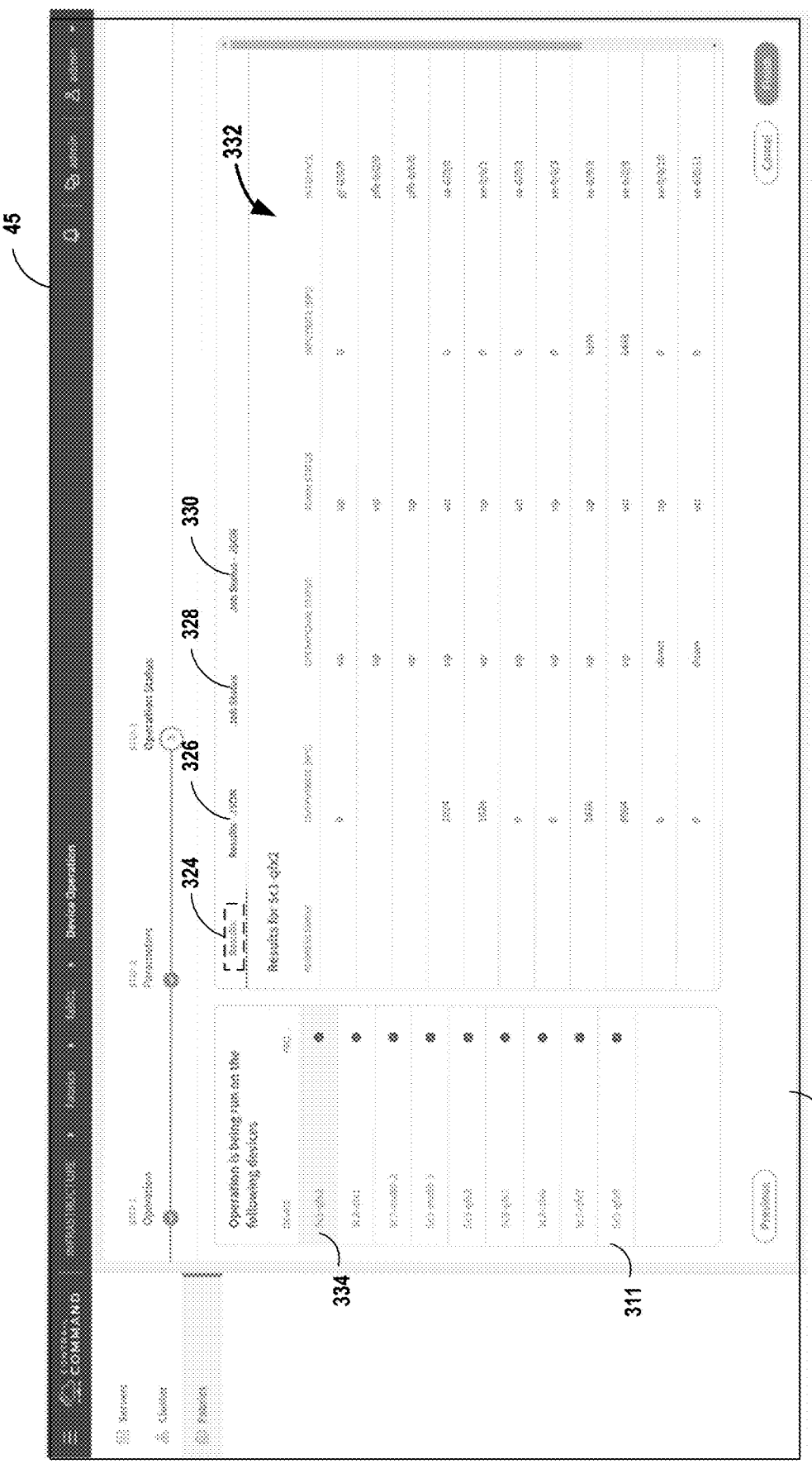
Figure 6G:
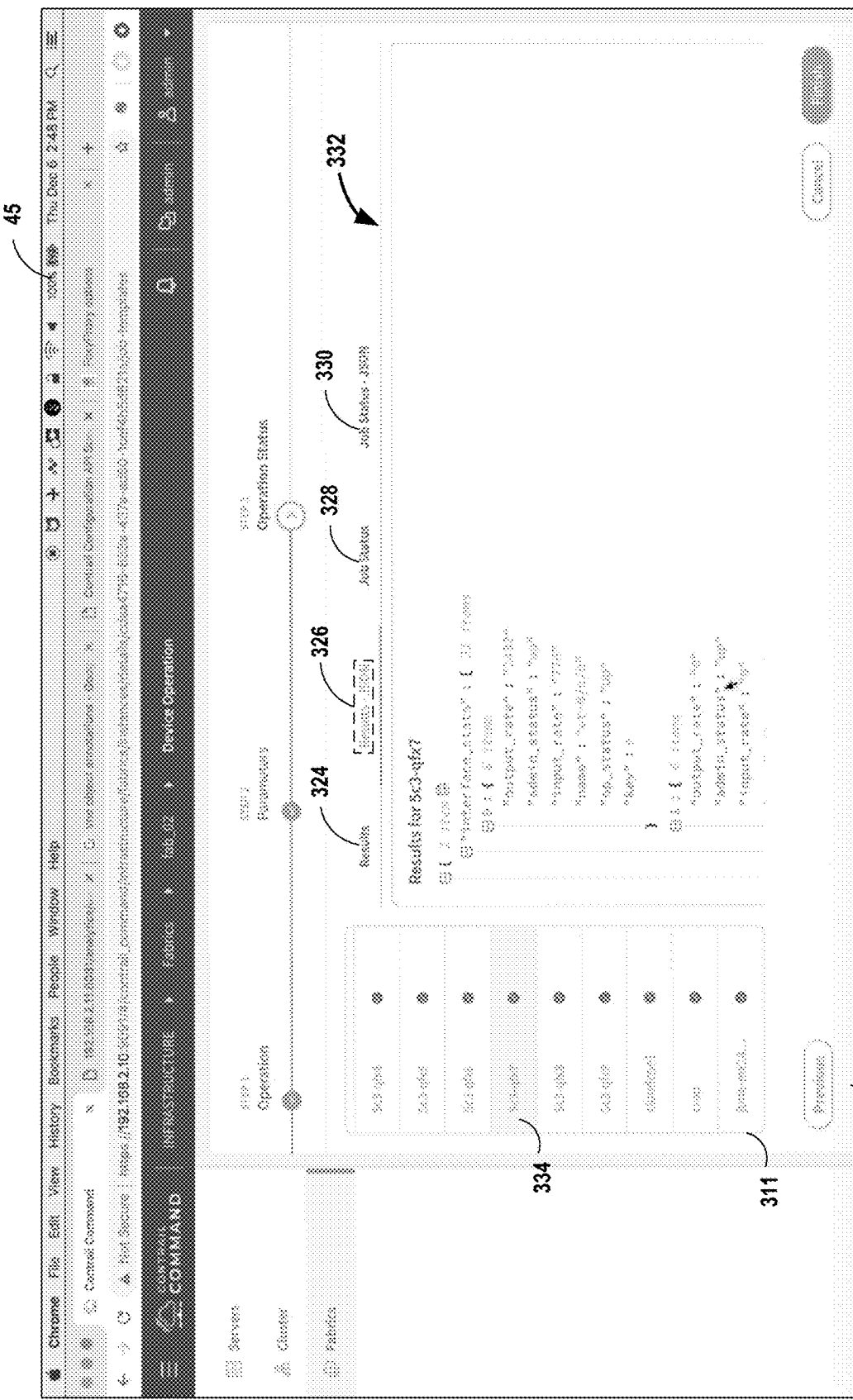
Figure 6H:
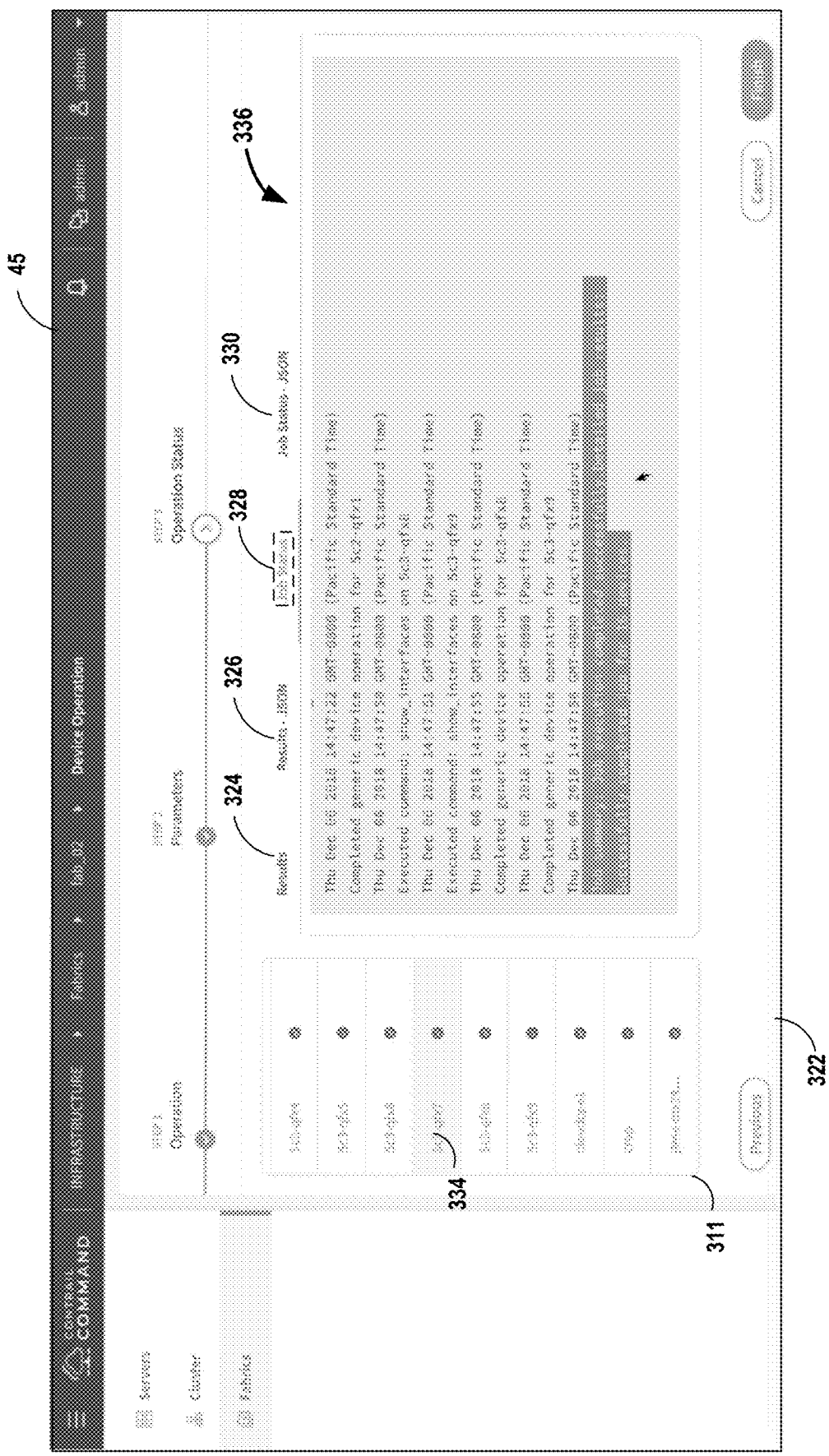

FIGS. 6F-6H illustrate a representative results pages for the command selected in FIG. 6C. In one example approach, results page 322 includes a window listing the list 311 of devices selected in FIG. 6A to run the "Show Configured Interfaces" command. In one example approach, results page 322 is arranged as a selection of tabbed windows: "Results" window 324, "Results-JSON" window 326, "Job Status" window 328 and "Job Status-JSON" window 330. As can be seen in FIG. 6F, in one example approach a tabbed "Results" window 324 displays results 332 received for a device 334 selected from list 311. In one example approach, the results of the command on the selected device 334 are displayed in "Results" window 324 of FIG. 6F the parameters displayed and the order and format of the display are as defined by the output schema of the device-independent command.

FIG. 6G illustrates one example approach for displaying the results 332 received for a device 334 selected from list 311. In one example approach, the results of the command on the selected device 334 are displayed in "Results-JSON" window 326 of FIG. 6G is a nested JSON file. In some such example approaches, the parameters displayed and the order and format of the display are as defined by the output schema of the device-independent command.

FIG. 6H illustrates one example approach for listing the job status 336 of the execution of the user-defined device-independent command on the devices 304 selected from the list 302 shown in FIG. 6A. In one example approach, the job status of the command executing on the selected device 334 is displayed in "Job Status" window 328 of FIG. 6H. Ideally, the information displayed in "Job Status" window 328 for any particular device selected is consistent, reflecting successful execution of the command on each device. In one example approach, the job logs track the entire job's progress (across all selected devices) and displays on "Job Status" window 328 the job logs for all selected devices selected from list 302 in FIG. 6A. In one such example approach, window 328 also displays a final summary message.

"Job Status-JSON" window 330 is not shown. In some example approaches, "Job Status-JSON" window 330 displays a JSON file presenting the information shown in FIG. 6H.

In some example approaches, the current number of devices that can be selected for device-independent commands is restricted to a maximum number of devices per job execution (e.g., 20). Such an approach may be necessary, for instance, when the time to poll the selected devices for output makes application to more than the maximum number of devices unwieldy. In one example approach, UI 45 polls all the prouter_uves for the current job and displays the output for each device across a representation of the device. If some devices have failed execution, then job_logs also carry the error message. In some example approaches, no outputs are displayed for failed devices.

Figure 7:
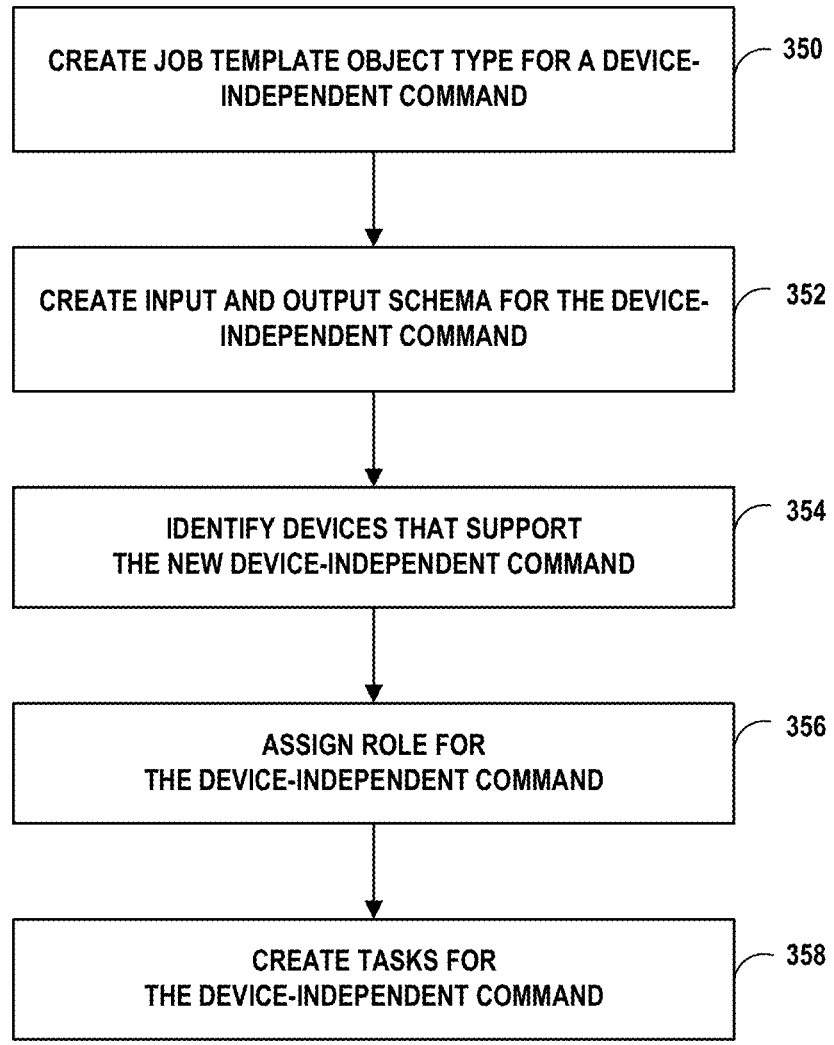
FIG. 7 is a flowchart illustrating an example approach for creating new device-independent commands on network devices of the software-defined network of FIGS. 3A and 3B, in accordance with techniques described herein.

In one example approach, VN controller 22 provides a mechanism by which users and administrators may add new device-independent commands, such as, for example, command presentation unit 64 of FIG. 3B. In one such example approach, a user creates a new device-independent command type, defines input and output schema for the new command type, identifies devices responsive to the new device-independent command type and defines the actions to be taken during the operation. FIG. 7 is a flowchart illustrating an example approach for creating new device-independent commands on network devices of the software-defined network of FIGS. 3A and 3B, in accordance with techniques described herein. In the example approach of FIG. 7, a user creates a job template object type for the new device-independent command (350). In one such example approach, the user creates a new job_template for each new device-independent command, setting the job_template_name to the command name. In one example approach, each new job template is stored in the job template data store 90 shown in FIG. 3B.

In one example approach, Ansible is used to define new device-independent commands. As noted above, Ansible is a provisioning, configuration and deployment tool that relies on playbooks to define sequences of tasks. Ansible uses playbooks to describe automation jobs as tasks via a human friendly data serialization language named YAML. YAML is standardized language commonly used for configuration files. It can, however, be used in any application where data is stored. YAML is very easy for humans to understand, read and write and can be used advantageously in an application like Ansible to describe and document playbooks.

In one example approach, VN controller 22 defines a common Ansible playbook (e.g., "/fabric_ansible_playbooks/operational_command.yml") referenced by each device-independent command job_template. In some Ansible-based example approaches, the user adds a job_template object type to a predef_payloads j son file (e.g., fabric_ansible_playbooks/conf/predef_payloads.json), setting the job_template_type to device_operation and, therefore, marking the new template as a device-independent command template. In some example approaches, changing the predef_payloads.json may require restarting the docker container associated with device-independent commands (e.g., config_api_1_xxxx docker). JavaScript Object Notation (JSON) files are files expressed in JavaScript Object Notation, an open-standard file format used to exchange data.

FIG. 8 is a block diagram illustrating an example job template associated with a device-independent command, in accordance with techniques described herein. As noted above, in some example approaches, each new device-independent command requires a new job_template. In the example shown in FIG. 8, the new device-independent command is entitled "show_config_interfaces" and the new job template is given the title "show_config_interfaces_template" at name 400. In the example shown in FIG. 8, job_template_type 402 is set to device_operation, which designates this job_template_type as a device-independent command template. And, as noted above all the device-independent command job_templates reference a common Ansible playbook found, in this example, at pointer 404 as:
/opt/contrail/fabric_ansible_playbooks/operational_command.yml Returning to FIG. 7, in the example approach of FIG. 7, a user defines input and output schema for the new device-independent command (352) as shown, for instance, in FIG. 8. In some example approaches, a form is defined that may be used to capture input parameters associated with the new device-independent command. In one such example approach, the form is based on the input schema (e.g., input or input_ui) defined for the device-independent command and is defined in the folder path:
opt/contrail/fabric_ansible_playbooks/schema/<command_name>_schema.json
where the command_name is the job_template_name minus the "_template." For instance, for a job_template with the name "show_config_interfaces_template", the input schema may be defined in the path:
opt/contrail/fabric_ansible_playbooks/schema/show_config_interfaces_schema.json
A UI input schema may also be used to define details such as place holders used or the ordering of the input parameters for the command. Schemas may be stored with the user-defined device-independent commands in data store 92.

As noted above, in one example approach, an "execute" kicks off the execute-job API in the backend. In one such example approach, the job runs in the background, displaying the updates, if desired, in the job logs on the UI 45. When the job is complete, UI 45 renders a page that shows the output results of running the command on all the devices where the command executed successfully.

Returning to FIG. 7, the user identifies devices 12, 16, 18 that support the new device-independent command (354), assigns a "role" for the new device-independent command (356) and adds tasks to the device-independent command playbook defining the tasks performed during the device-independent command (358).

As noted above, VN controller 22 as described above uses role-based and profile-based device management to decouple config/operation functionality in each network device 12, 16, 18 from specific generic operations. Each device-independent command has a "role" (usually defined by its name), and the operation is performed on a profile of the target device defined by its profile (defined, in some instance, by its device model). By leveraging the concept of role-based and profile-based device management, this framework may be used to automate a single operation across multiple device vendors, providing the user a consistent view of the results regardless of the vendor-specific output/data provided by specific vendor:device models.

An example approach to defining a new generic device command is defined below. In one example approach, all the changes described are done inside a config_api_docker. Some of the changes may require restarting the docker. The example illustrates the steps in adding the new generic device command "show_config_interfaces" referenced above in FIG. 8. In the following example, at least one device in the fabric is a Juniper SRX device, the command name is "show_config_interfaces", the vendor associated with the device to be tested is "Juniper" and the device family is "junos-es".

As noted above in the discussion of FIGS. 7 and 8, the first step is to create a job template object type. In one example approach, a user creates a job template named <command_name> template with type "device_operation." In this example the job template is named "show_config_interfaces_template" and is of type "device_operation." In one example approach, the new job template object type is added to the list of job_template object types in predef_payloads.json. In one example approach, marking the job_template_type as "device_operation" ensures that the new command is listed in UI 45. Playbook_uri 406 (shown in FIG. 8) may be used to add the file path for any new command. In some example approaches, however, there is only one common entry point for any command operation. In some example approaches, the remaining fields of the show_config_interfaces_template are filled as shown in FIG. 8.

Input and output schema will be discussed next. In one example approach shown in FIG. 8, the schema files are left blank. In one example approach, a user creates the necessary schema file by name as <command_name>_schema.json under the directory name /opt/contrail/fabric_ansible_playbooks/schema/. In one example approach, the schema file includes one or more of input schema, output schema and UI schema. In one example approach, the input schema for the show_config_interfaces command includes two input parameters: interface filters and the interface type as shown below:

```
"input_schema" :{
    "$schema" : "http://json-schema.org/draft-06/schema#" ,
    "additionalProperties" : false ,
    "properties" :{
        "interface_type" :{
            "$id" : "/properties/interface_type" ,
            "type" : "string" ,
            "default" : "physical" ,
            "enum" : [ "physical" , "logical" ]
        },
        "interface_filters" :{
            "$id" : "/properties/interface_filters" ,
            "type" : "array" ,
            "items" :{
                "$id" : "/properties/interface_filters/items" ,
                "type" : "object" ,
                "maxProperties" : 2 ,
                "additionalProperties" : false ,
                "properties" : {
                    "op" : { "enum" : [ "regex", "startwith" ]},
                    "expr" : { "type" : "string" }
                },
                "title" : "filter object" ,
                "description" : "filter object having op and expr fields"
                ,
                "default" :{ },
                "examples" :[
                    { "op" : "regex" , "expr" : "^ge-" },
                    { "op" : "regex" , "expr" : "^xe" }
                ]
            }
        }
    }
}
```

In one example approach, a UI schema provides selected UI features. In one such example approach, the UI schema includes UI placeholder and ordering of form data in cases where there are a large number of input parameters. One such example is shown below:

```
"input_ui_schema" :{
    "interface_type" : {
        "ui:help" : "Select one type at a time"
    },
    "interface_filters" : {
        "op" : {
            "ui:placeholder" : "regex"
        },
        "expr" : {
            "ui:placeholder" : "^ge-|^xe"
        },
        "ui:help" : "filter using regex"
    }
}
```

In one example approach, an output schema varies as a function of the specific generic device command. In the example shown for the show_config_interfaces device-independent command, a user may want to predominately derive the operational state information of the interfaces. In some example approaches, the output schema is actually under command_output as the output schema is the job's output schema. The format, therefore, for any other command will mostly be similar except for the command_output part in the output schema. One such example is shown below:

```
"output_schema":{
    "$schema":"http://json-schema.org/draft-06/schema#",
    "title":"Show config interfaces command Job Output",
    "type": "object",
    "properties": {
        "results": {
            "type": "array",
            "description": "Array holding the job specific output details in case of success.
Each object would be the command_output and device name pair.",
            "items": {
                "type": "object",
                "properties": {
                    "device_name": {
                        "type": "string",
                        "title": "DeviceName",
                        "description": "name of the device for which results are displayed"
                    },
                    "command_output": {
                        "type": "object",
                        "title": "Each playbook's command_output for this specific command.",
                        "description": "Results of the show interfaces command executed on the
device. The jinja template matching this command, vendor and family would give
output of the below format. This command_output translates to device_op_results in
the PR uve",
                        "properties": {
                            "interface_stats": {
                                "type": "array",
                                "title": "Interfaces Statistics",
                                "description": "Display statistics and detailed output",
                                "items": {
                                    "type":"object",
                                    "additionalProperties": false,
                                    "properties": {
                                        "name": {
                                            "type": "string",
                                            "title": "Interface",
                                            "description": "Interface name"
                                        },
```

```
            "op_status": {
                "type": "string",
                "title": "Operational Status",
                "description": "Operational status of the interface"
            },
            "admin_status": {
                "type": "string",
                "title": "Admin Status",
                "description": "Admin status of the interface"
            },
            "address_family": {
                "type": "string",
                "title": "Address Family",
                "description": "Address family if present"
            },
            "input_rate": {
                "type": "string",
                "title": "InputRate (bps)",
                "description": "Input packets rate in bits per second if present"
            },
            "output_rate": {
                "type": "string",
                "title": "OutputRate (bps)",
                "description": "Output packets rate in bits per second if present"
            }
          }
         }
        }
       }
      }
     }
    }
   }
  }
 }
}
```

Jinja templates are templates created using the Jinja2 templating language.

In the present example approach, the user next creates the appropriate role for the command show_config_interfaces. This may be as simple as naming the command.

FIG. 9 illustrates a representative network device on which device-independent commands may be performed, in accordance with techniques described herein. In the example approach of FIG. 9, the device is a router. It is defined via a name 450, a vendor 452, a device family 454, a product name 456 and a management IP address 458. The show_config_interfaces command may be configured to operate on the router of FIG. 9 as detailed below.

Figure 10:
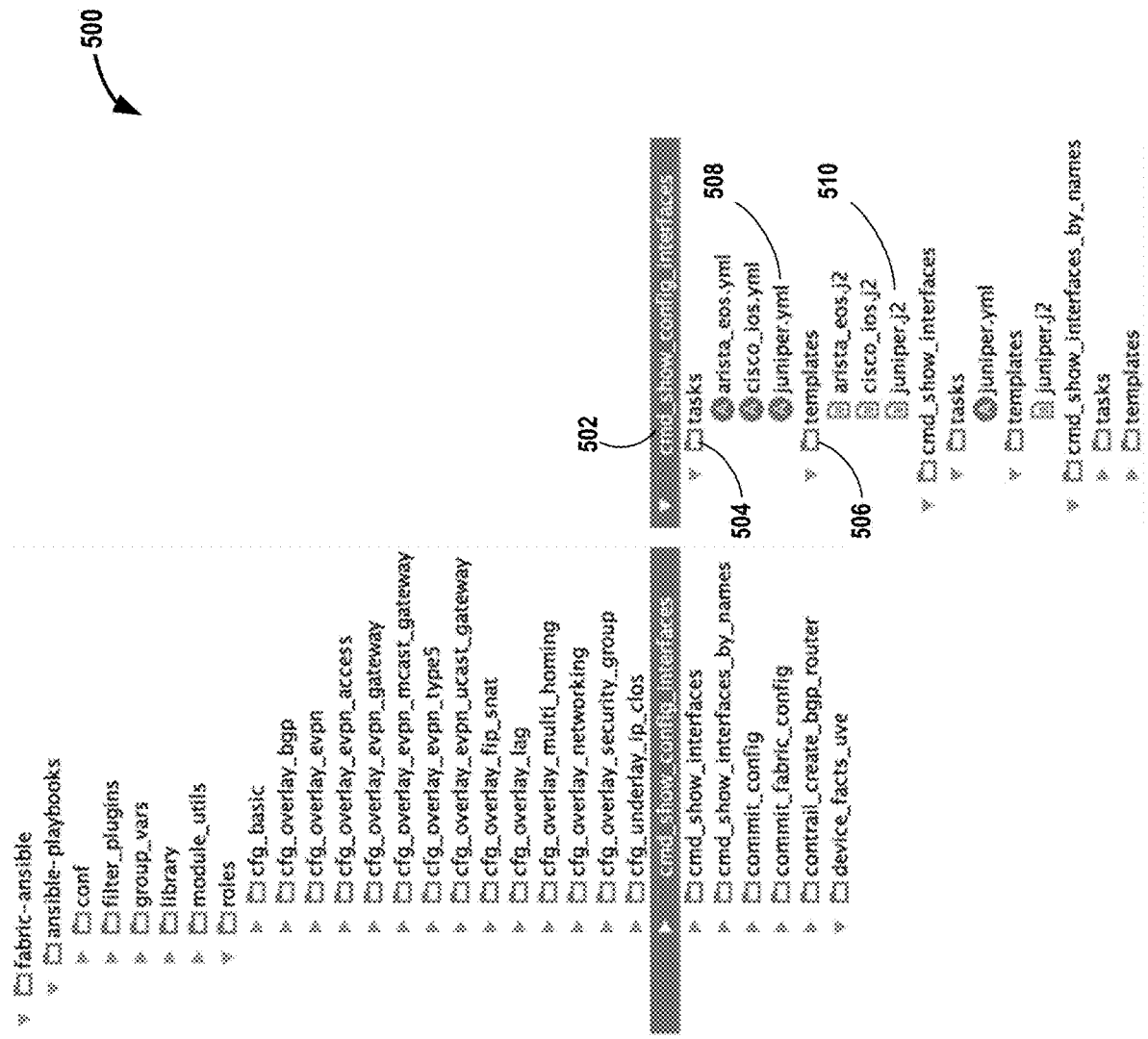
FIG. 10 illustrates an example directory structure that may be used to organize device-independent commands, in accordance with techniques described herein.

FIG. 10 illustrates an example directory structure that may be used to organize device-independent commands, in accordance with techniques described herein. In the example approach of FIG. 10, the assigned role (i.e., "show_config_interfaces") defines a directory 500 that houses a role folder 502 (i.e., "cmd_show_config_interfaces") for each device-independent command. In the example shown in FIG. 10, the Ansible playbooks associated with the command are stored in a tasks folder 504 and the templates associated with the command are stored in a templates folder 506. In one example approach, the top directory path of the role folder is:

/opt/contrail/fabric_ansible_playbooks).

In the approach shown in FIG. 10, the user creates the tasks folder 504 under the cmd_show_config_interfaces folder 502 and adds an Ansible playbook 508 for each device 12, 16, 18 on which the command will be executed. In one such example approach, Ansible playbooks for device families are labeled <device_vendor>_<device_family>.yml. If, however, the parsing to decode the command_resp (shown in FIG. 11) operates correctly on all device families under a given vendor, the Ansible playbook for the given vendor is labeled <device_vendor>.yml. Templates 510 (e.g., for Juniper, Cisco or Arista devices) are listed under template folder 506. In the example shown in FIG. 10, the templates are defined as Jinja templates. As noted above, Jinja2 is a templating language for Python that stores its templates as Jinja templates. Other templating languages may be used as well.

FIG. 11 illustrates an example Ansible playbook for the router of FIG. 9. In the example Ansible playbook 550 of FIG. 11, the commands 552, when performed by command processing unit 62, perform the tasks associated with the device-independent command "show_config_interfaces" at the device_management_ip addresses of one or more Juniper devices using Juniper Junos CLI commands. Execution of the show_config_interfaces device-independent command at the management IP address returns the results of the Juniper Junos CLI commands for that router device. The response is then stored in a "command_resp" register 554 and recorded in the variable command_response 556 for access by the logic of the show_config_interfaces device-independent command. The Ansible playbooks for Arista and Cisco devices follow a similar convention but are adapted to the associated device commands of the Arista and Cisco devices, respectively.

As noted above, users define playbooks 550 corresponding to device vendor and device family. In the example shown in FIG. 11, the Ansible playbook 550 could have been labeled juniper_junos-es.yml. Since, however, the device-independent command works across all Juniper devices, the juniper.yml label is used.

It should be noted that the number of tasks in each playbook is a function of the underlying device. The approach described above for the Juniper router performs a single task, receives the results in a register and transfers the register contents to a variable used by the show_config_interfaces device-independent command. Other vendors' products might require a number of tasks to achieve similar results. The advantage of the above described approach, however, is that it doesn't matter. The same device-independent command may be run on any number of devices as long as a playbook and a template can be defined for each device.

Figure 12:
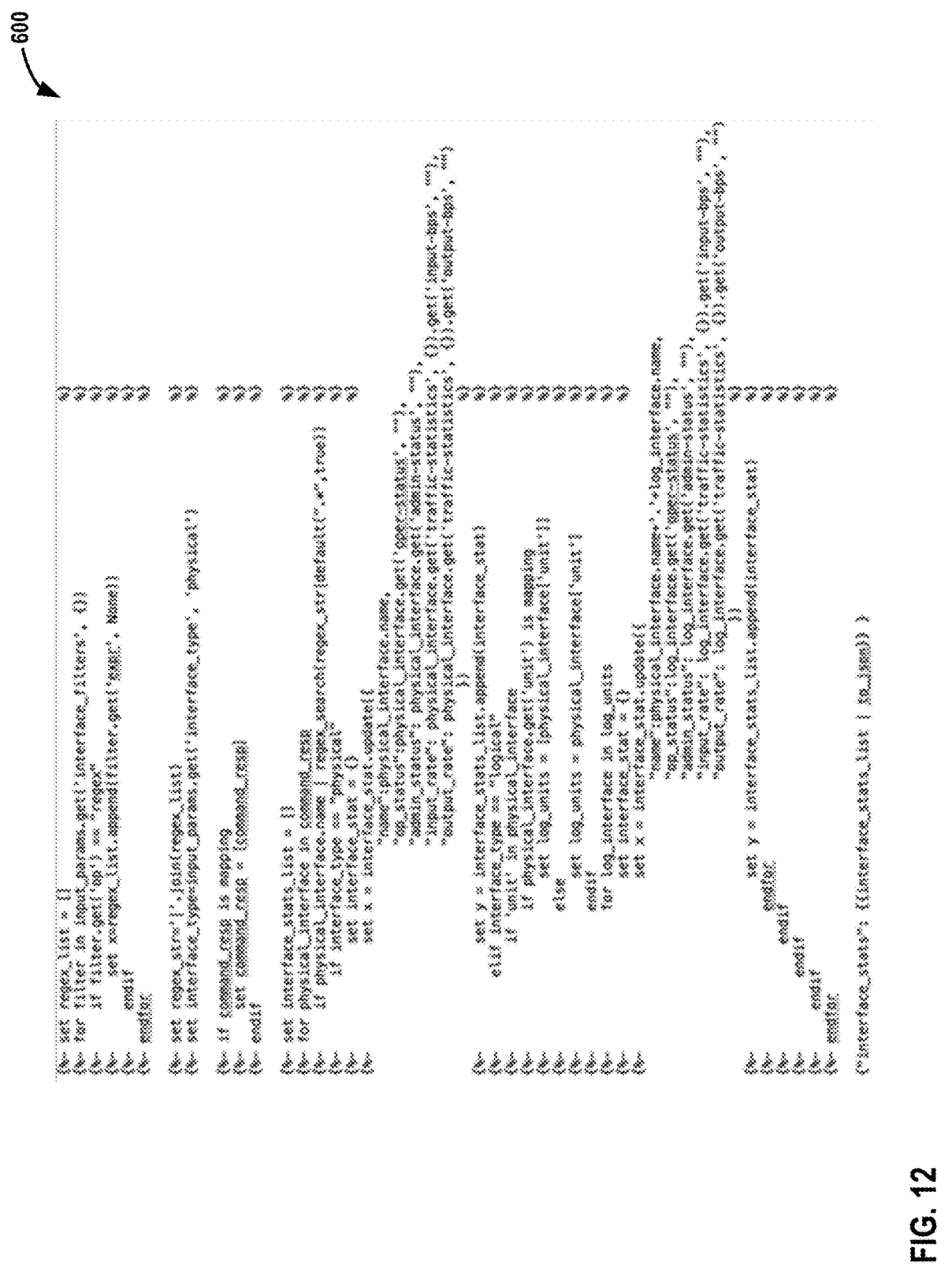

FIG. 12 illustrates an example template for device-independent command on a specified network device, according to one aspect of the disclosure. A user creates templates 600. Each template 600 is associated with a device family and a device vendor. In the example shown in FIG. 12, template 600 is a Jinja template that is parsed with a Jinja2 engine. In one example approach, the same naming convention is used for templates as for playbooks. In this case, template 600 could be labeled "juniper_junos-es.j2." Since, however, the parsing to decode the command_resp variable from Ansible playbook 500 of FIG. 11 operates successfully across all Juniper device families, template 600 may be labeled as juniper.j2 as shown in FIG. 10. In one example approach, the parsed output of the Jinja2 engine is recorded in a structure similar to the command_output j son structure defined in the output schema described above.

In one example approach, the output of each device-independent command is stored as a JSON file in a folder labeled by the command name. One such example folder is shown below:
/opt/contrail/fabric_ansibleplaybooks/generic_device_operations/<command_name>
In one example approach, the parsed JSON output of command execution on the device is stored as in a file named <device_management_ip>.json. In the case of the device of FIG. 10, the results of the command execution of the "show_config_interfaces" device-independent command is stored as 10.175.72.108.json.

FIG. 13 illustrates an output file resulting from execution of a device-independent command on a selected network device, according to one aspect of the disclosure. In the example approach of FIG. 13, the results read from the command_resp variable for each device that is subject to the device-independent command of FIG. 8 are stored in a JSON file as nested data, with a separate JSON file stored for each device. A representative output file 700 is shown in FIG. 13. In some example approaches, file 700 has a format defined by an output schema defined for the job template of the device-independent command as noted above.

What has been described above is an advantageous way to execute device-independent commands across products of different product vendors while achieving similar results. Operations on device families may be expressed as tasks and templates using Ansible playbooks and Jinja2 templates, respectively. In one example approach, a graphical user interface 45 on VN controller 22 provides a mechanism for defining the generic operation and applying the device-independent command to devices based on representative task and template files. The result provides flexibility in conducting device agnostic tests across heterogenous networks.

Such techniques eliminate the need for specific device operations/commands and remove user interface dependencies based on specific devices. Instead, generic operations rely on input and output data models, which may be rendered dynamically. In addition, in some example approaches, VN controller 22 uses role-based and profile-based device management to decouple config/operation functionality in each network device from specific generic operations. By leveraging the concept of role-based and profile-based device management, this framework can be used to automate a single operation across multiple device vendors, providing the user a consistent view of the results regardless of the vendor-specific output/data provided by specific vendor:device models.

The techniques described herein, including in the preceding any of sections, may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively, or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random-access memory (RAM), read-only memory (ROM), non-volatile random-access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A method comprising:
   receiving, by a virtual network controller, data indicative of input defining a device-independent command including an output schema of the device-independent command, wherein the device-independent command, when executed, performs one or more operations on a supported network device, the one or more operations defined by a job template associated with the device-independent command;
   selecting, by the virtual network controller and for each of a plurality of network device families and based on a different set of commands associated with a corresponding network device family of the plurality of network device families, one or more tasks that, when executed by a network device from the corresponding network device family, perform the one or more operations of the device-independent command, wherein the tasks are defined by a device-independent command playbook for the device-independent command, the device-independent command playbook referenced by the job template;

causing, by the virtual network controller, a first network device associated with one of the plurality of network device families to perform the operations of the device-independent command on the first network device, wherein to perform includes executing the tasks selected for the one of the plurality of network device families;

storing, by the virtual network controller, output variable data received from the first network device in response to the first network device executing the tasks selected for the one of the plurality of network device families; and outputting, by the virtual network controller for display, a results page showing command output for the first network device based on the output variable data, wherein parameters displayed on the results page and an order and format in which the results page is displayed are defined by the output schema.

2. The method of claim 1, further comprising assigning a role to each device-independent command.

3. The method of claim 1, further comprising storing the tasks as the device-independent command playbook associated with the device-independent command and associated with a device vendor associated with the network device.

4. The method of claim 1, further comprising storing one or more schema associated with the device-independent command.

5. The method of claim 4, wherein the schema includes an input schema defining input parameters associated with the device-independent command.

6. The method of claim 5, wherein the output schema defines how to present information received from the first network device in response to the first network device executing the tasks selected for the one of the plurality of network device families.

7. The method of claim 1, further comprising:
outputting, for display, an indication of one or more locations of a graphical user interface configured to receive, during execution of the tasks selected for the one of the plurality of network device families, user input associated with the device-independent command,
wherein the one or more locations include one or more of: a window configured to receive text inputs, and a drop down menu.

8. The method of claim 1, wherein the device-independent command playbook specifies the tasks in the form of a data serialization language.

9. A virtual network controller comprising:
a memory; and
one or more processors connected to the memory,
wherein the memory includes instructions that, when executed by the one or more processors, cause the one or more processors to:
receive data indicative of input defining a device-independent command including an output schema of the device-independent command, wherein the device-independent command, when executed, performs one or more operations on a supported network device, the one or more operations defined by a job template associated with the device-independent command;

select, for each of a plurality of network device families and based on a different set of commands associated with a corresponding network device family of the plurality of network device families, one or more tasks that, when executed, perform the one or more operations of the device-independent command on a network device from the corresponding network device family, wherein the tasks are defined by a device-independent command playbook for the device-independent command that specifies the tasks in the form of a data serialization language, the device-independent command playbook referenced by the job template;

cause a first network device, associated with one of the plurality of network device families, to perform the operations of the device-independent command on the first network device, wherein to perform includes executing the tasks selected for the one of the plurality of network device families;

store output variable data received from the first network device in response to the first network device executing the tasks selected for the one of the plurality of network device families; and output for display a results page showing command output for the first network device based on the output variable data, wherein parameters displayed on the results page and an order and format in which the results page is displayed are defined by the output schema.

10. The virtual network controller of claim 9, wherein the memory further includes instructions that, when executed by the one or more processors, cause the one or more processors to:
assign a role to each device-independent command.

11. The virtual network controller of claim 9, wherein the memory further includes instructions that, when executed by the one or more processors, cause the one or more processors to:
store the tasks as a device-independent command playbook associated with the device-independent command and associated with a device vendor associated with the network device.

12. The virtual network controller of claim 9, wherein the memory further includes instructions that, when executed by the one or more processors, cause the one or more processors to:
store one or more schema associated with the device-independent command.

13. The virtual network controller of claim 12, wherein the output schema defines how to present information received from the first network device in response to the first network device executing the tasks selected for the one of the plurality of network device families.

14. The virtual network controller of claim 9, wherein the memory further includes instructions that, when executed by the one or more processors, cause the one or more processors to:
output for display an indication of one or more locations of a graphical user interface configured to receive, during execution of the tasks selected for the one of the plurality of network device families, user input associated with the device-independent command, wherein the one or more locations include one or more of: a window configured to receive text inputs, and a drop down menu.

15. A computer-readable storage medium comprising instructions that, when executed, cause one or more processors of a virtual network controller to:

receive data indicative of input defining a device-independent command, wherein the device-independent command including an output schema of the device-independent command, when executed, performs one or more operations on a supported network device, the one or more operations defined by a job template associated with the device-independent command;

select, for each of a plurality of network device families and based on a different set of commands associated with a corresponding network device family of the plurality of network device families, one or more tasks that, when executed, perform the one or more operations of the device-independent command on a network device from the corresponding network device family, wherein the tasks are defined by a device-independent command playbook for the device-independent command that specifies the tasks in the form of a data serialization language, the device-independent command playbook referenced by the job template;

cause a first network device, associated with one of the plurality of network device families, to perform the operations of the device-independent command on the first network device, wherein to perform includes executing the tasks selected for the one of the plurality of network device families; and store output variable data received from the first network device in response to the first network device executing the tasks selected for the one of the plurality of network device families; and output for display a results page showing command output for the first network device based on the output variable data, wherein parameters displayed on the results page and an order and format in which the results page is displayed are defined by the output schema.

* * * * *